United States Patent [19]
Clark et al.

[11] Patent Number: 6,001,922
[45] Date of Patent: Dec. 14, 1999

[54] SMALL PARTICLE SIZE POLYESTER/ACRYLIC HYBRID LATEXES

[75] Inventors: Mark Dwight Clark; Hieu Duy Phan; James Russell Salisbury; Glen Dennis Shields, all of Kingsport, Tenn.

[73] Assignee: Eastman Chemical Company, Kingsport, Tenn.

[21] Appl. No.: 08/911,702

[22] Filed: Aug. 15, 1997

Related U.S. Application Data

[63] Continuation-in-part of application No. 08/594,564, Jan. 31, 1996, abandoned, said application No. 08/900,470, Jul. 25, 1997, abandoned, and application No. PCT/US97/01684, Jan. 31, 1997

[60] Provisional application No. 60/024,054, Aug. 16, 1996, and provisional application No. 60/024,055, Aug. 16, 1996.

[51] Int. Cl.$^6$ .................................................. C08L 67/00
[52] U.S. Cl. ........................ 524/513; 524/457; 524/502; 524/507; 524/510; 524/514; 524/515; 524/523; 524/556
[58] Field of Search ..................... 524/513, 388, 524/457, 502, 507, 510, 514, 523, 556

[56] References Cited

U.S. PATENT DOCUMENTS

| | | | |
|---|---|---|---|
| 4,150,005 | 4/1979 | Gehman et al. | 524/533 |
| 4,325,856 | 4/1982 | Ishikawa et al. | 524/458 |
| 4,704,309 | 11/1987 | Coney et al. | 427/258 |
| 4,839,413 | 6/1989 | Kiehlbauch et al. | 524/460 |
| 4,916,171 | 4/1990 | Brown et al. | 523/161 |
| 4,939,233 | 7/1990 | Jenkins et al. | 528/272 |
| 4,946,932 | 8/1990 | Jenkins | 528/272 |
| 5,156,651 | 10/1992 | Girardeau et al. | 8/115.6 |
| 5,277,978 | 1/1994 | Feustel et al. | 428/402 |
| 5,326,843 | 7/1994 | Lorah et al. | 526/318.6 |
| 5,342,877 | 8/1994 | Clark | 524/513 |

FOREIGN PATENT DOCUMENTS

| | | |
|---|---|---|
| 0 221 498 | 5/1987 | European Pat. Off. . |
| 0 356 341 | 2/1990 | European Pat. Off. . |
| 0 448 391 | 9/1991 | European Pat. Off. . |
| 0 540 939 | 7/1992 | European Pat. Off. . |
| 2 109 802 | 6/1983 | United Kingdom . |
| WO 92 12195 | 7/1992 | WIPO . |
| WO 95 01381 | 1/1995 | WIPO . |

OTHER PUBLICATIONS

*Emulsion Polymers & Emulsion Polymerization*, "The Formation of Coagulum in Emulsion Polymerization", by J.W. Vanderoff, 1981, American Chemical Society.
J. Appl. Polymer Sci., 44, 1075 (1992) M. Lambla et al.

*Primary Examiner*—Mark L. Warzel
*Attorney, Agent, or Firm*—Harry J. Gwinnell, Esq.; Rose M. Allen, Esq.

[57] ABSTRACT

This invention provides the preparation of water-dispersible polyester/acrylic hybrids via a two-stage emulsion polymerization process. For example, methacrylic acid and/or 2-hydroxyethyl methacrylate are copolymerized with styrene/acrylic monomers to yield a relatively hydrophilic and hydro-plasticized first stage. Subsequent additions of hydrophobic monomers to this first stage "seed" results in an inversion of the latex such that the more hydrophilic first stage is at the particle surface. This results not only in improved stability of the resulting latex without the use of additional surfactants, as evidenced by the production of reduced amounts of coagulum, while it also offers relatively low minimum filming temperatures due to the hydroplasticization of the shell of the particle. Furthermore, the use of the water-dispersible polyester results in extremely fine latex particle sizes which can significantly enhance coating properties such as film gloss and clarity.

24 Claims, No Drawings

SMALL PARTICLE SIZE POLYESTER/ACRYLIC HYBRID LATEXES

This application is a continuation-in-part of U.S. application Ser. No. 08/594,564, filed Jan. 31, 1996, now abandoned, a continuation-in-part of U.S. application Ser. No. 08/900,470, filed Jul. 25, 1997, now abandoned, and a continuation-in-part of international Application No. PCT/US97/01684, filed Jan. 31, 1997 which designated the U.S. This application also claims the benefit of U.S. Provisional Application No. 60/024,054 and U.S. Provisional Application No. 60/024,055, both filed Aug. 16, 1996.

FIELD OF THE INVENTION

This invention belongs to the field of emulsion chemistry. In particular, this invention relates to a method for preparing small particle size polyester/acrylic hybrid latexes.

BACKGROUND OF THE INVENTION

The particle size of a latex can often have a direct impact on the performance of a coating prepared from that latex. Among those properties that can be affected are gloss, clarity, film formation, and substrate penetration (i.e., for porous substrates). In a very general sense, a smaller particle size will have a positive effect on such properties. Small particle sizes (i.e., <100 nm) are most often achieved by using relatively high levels (2–4 wt) of small molecule, typically anionic, surfactants such as AEROSOL-OT, sodium dioctyl sulfosuccinate and AEROSOL NPES 2030, ammonium nonylphenoxy polyethoxy ethanol sulfate, which are anionic surfactants sold by Cytec Industries, Inc. However, small particle size and the properties directly affected by it are not the only important properties in water-based coatings. Of primary importance is the water-resistance/sensitivity of the final film. In small particle size systems, the high level of anionic surfactant, the very component in the latex which gives the small particle size and all of its concomitant advantages, is also likely to be detrimental to water-resistance.

One further challenge in the preparation of any stable latex is production of a stable emulsion with minimal amounts of coagulum. As noted in *Emulsion Polymers and Emulsion Polymerization*, "The Formation of Coagulum in Emulsion Polymerization", by J. W. Vanderhoff, 1981, American Chemical Society, coagulum, i.e., polymer recovered in a form other than that of a stable latex, is produced in all sizes of reactors and poses several problems. Such problems include loss of yield of the desired latex, processing difficulties due to the necessity of clean-up, more batch-to-batch variation in latex properties, and health, safety, and environmental problems insofar as the coagulum must be disposed of; this is made more problematic due to entrapment within the coagulum of toxic monomers such as vinyl chloride and acrylonitrile. According to this reference, the formation of coagulum is due to either a failure of the colloidal stability of the latex during or after polymerization, which leads to flocculation of the particles or by polymerization of the monomer(s) by mechanisms other than by the intended emulsion polymerization.

U.S. Pat. No. 5,342,877 describes a method for preparing small particle size latexes via copolymerization of hydroxyalkyl (meth)acrylates (15–40 weight percent based on total latex solids) and other vinyl/acrylic monomers (particularly styrene) in the presence of water-dispersible polyesters.

U.S. Pat. No. 4,939,233 describes a method for preparing water-dispersible polyester/vinyl acetate copolymer blends via emulsion polymerization using sulfonated polyesters as stabilizers in the reaction.

U.S. Pat. Nos. 4,946,932 and 5,277,978 describe a methods for preparing water dispersible polyester/-acrylic copolymer blends via emulsion polymerization in the presence of sulfonated polyesters as stabilizers.

U.S. Pat. No. 5,156,651 describes water dispersible polyester/vinyl aromatic latexes for textile sizing applications.

U.S. Pat. No. 4,839,413 describes the use of low molecular weight (i.e., less than 20,000) alkali-soluble resins as "support resins" in emulsion polymerization. The support resin is formed via non-aqueous polymerization methods and is subsequently dispersed/dissolved in alkaline solution. The emulsion polymerization is then carried out, at high pH, in the presence of this dissolved support resin and an additional costabilizer (surfactant). A pH of greater than 8 is taught to be necessary.

U.S. Pat. No. 5,326,843 describes a process for preparing low molecular weight (i.e., less than 40,000) alkali-soluble polymers via emulsion polymerization. Unsaturated aromatic monomers (e.g. styrene), methacrylic acid, and low pH (less than 4.5) are specifically taught.

U.S. Pat. No. 4,325,856 describes the preparation of a multistage latex in which the first stage is more hydrophilic (via incorporation of acid functional monomers) than the second stage thereby resulting in an inverted core-shell morphology. Typical anionic surfactants such as potassium n-dodecyl sulfate, sodium isooctylbenzene sulfonate, sodium laurate, and nonylphenol esters of polyethylene glycols are used to stabilize the latexes. Latex particle sizes of 130–160 nm are reported. Unlike the methodology taught in U.S. Pat. No. 4,839,413, complete neutralization of the acid-functional first stage is not necessary.

U.S. Pat. No. 4,150,005 describes the preparation of a multistage latex in which the first stage is more hydrophilic than the second stage, thereby resulting in an inverted core-shell morphology. Typical small molecule anionic surfactants such as alkali metal and ammonium salts of alkyl, aryl, alkaryl, and aralkyl sulfonates, sulfates and polyether sulfates, and corresponding phosphates and phosphonates, and ethoxylated fatty acids, esters, alcohols, amines, amides and alkyl phenols, are used to stabilize the latexes. As with the methodology described in U.S. Pat. No. 4,325,856, complete neutralization of the first stage is not necessary. Furthermore, combinations of methacrylic acid and hydroxyethyl methacrylate as hydrophilic components of the first stage are claimed as is a range of hydrophilic copolymer of 20–80 wt % of the total latex. The advantages of using the hydroplasticized first stage to lower minimum filming temperatures are also described.

U.S. Pat. No. 4,916,171 describes technology very similar to that described in U.S. 4,150,005 with the exception that the only hydrophilic monomers claimed are carboxylic acids. A much broader range for the hydrophilic polymer of 1–99 wt % of the total latex is claimed. This reference also teaches that the hydrophilic shell polymer has a very high Tg (>100° C.) and that the most preferred range of hydrophilic polymer is 40–60 wt % of the total latex.

J. Appl. Polymer Sci., 44, 1075 (1992) (M. Lambla et al.) describes the terpolymerization of styrene/butyl acrylate/methacrylic acid in the presence of low levels of sodium dodecyl sulfate, a small molecule surfactant, with the subsequent copolymerization of styrene/butyl acrylate in the presence of the acid functional latex. Inverted core-shell latexes (i.e. acid functional 1st stage at particle surface) with average particle sizes of 250 nm resulted from this method. As with U.S. Pat. No. 4,839,413 described above, high pH is a critical part of the process for preparing these materials.

SUMMARY OF THE INVENTION

This invention provides the preparation of water-dispersible polyester/acrylic hybrids via a two-stage emulsion polymerization process. In an example of the process, hydrophilic monomers such as methacrylic acid and/or 2-hydroxyethyl methacrylate are copolymerized with other more hydrophobic monomers such as styrene and/or (meth) acrylate esters other than hydroxy-functional esters in the presence of a water-dispersible polyester or polyester-amide to yield a relatively hydrophilic first stage. Subsequent additions of hydrophobic monomers to this relatively hydrophilic first stage "seed" results in an inversion of the latex such that the more hydrophilic first stage is at the particle surface. This results in the hydrophilic polymer acting essentially as a costabilizer with the water-dispersible polyester or polyester-amide. This in turn results in significantly improved in-process stability of the resulting latex as evidenced by the production of reduced amounts of coagulum and effectively eliminates the need for small molecule cosurfactants. In the practice of this invention, coagulum can be as low as 0.3 g per Kg of latex solids. Further, the use of the water-dispersible polyester or polyester-amide results in extremely fine particle sizes which can significantly enhance final coating properties such as film gloss and clarity.

DETAILED DESCRIPTION OF THE INVENTION

The present invention provides a polyester/acrylic hybrid latex prepared by free radical emulsion polymerization, said latex prepared in two stages, wherein in a first stage, a free radical emulsion polymer is prepared from about 10–40 weight percent of hydrophilic monomers and about 90–60 weight percent of hydrophobic monoethylenically unsaturated monomers, based on the total weight of monomers used, wherein said hydrophobic monoethylenically unsaturated monomers are comprised of at least about 10 weight percent of styrene, in the presence of a water-dispersible sulfonated polyester or polyester-amide; and wherein in a second stage, at least one hydrophobic monomer is free radically polymerized in the presence of the free radical emulsion polymer and the water-dispersible sulfonated polyester or polyester amide from the first stage, wherein the weight of monomers to prepare said first stage comprises about 5 to 70 weight percent of total monomers used.

The first stage polymer preferably makes up about 15–55 weight percent of the total weight of the latex particle.

In the above latex the first stage is preferably prepared from 15–30, most preferably 20–25, weight percent of hydrophilic monomers.

The water-dispersible polyester or polyester-amide is preferably comprised of:

(i) monomer residues of at least one dicarboxylic acid;
(ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
(iii) monomer residues of at least one diol or a mixture of a diol and a diamine; and optionally:
(iv) monomer residues of at least one difunctional monomer reactant selected from hydroxycarboxylic acids, aminocarboxylic acids and aminoalkanols;

provided that at least 20 percent of the groups linking the monomeric units are ester linkages.

The water-dispersible polyesters and polyester-amides useful in the practice of this invention are described in U.S. Pat. Nos. 3,734,874; 3,779,993; 3,828,010; 3,546,008; 4,233,196; and 4,335,220, incorporated herein by reference.

The water dispersible polyesters and polyester-amides are, for the most part, water-dispersible because they form electrostatically-stabilized colloids when mixed with water. The colloid particle size varies with the polymer composition but has been shown by light diffraction studies and transmission electron microscopy (on fresh films) to be mostly 200–800 Å in diameter. The aqueous colloid dispersions exhibit a minimum precipitation of solid material with time, in the temperature range of 0.1–99.9° C. because the relationship between the particle densities and viscosities (very similar to those of water when concentrations are less than 30 weight percent) are such that thermal energy expressed as Brownian motion is sufficient to keep the particles suspended in water.

The water-dispersible polyesters have an inherent viscosity of at least 0.1 dL/g, preferably about 0.28–0.38 dL/g, when determined at 25° C. using 0.25 g polymer per 100 ml of a solvent consisting of 60 parts by weight phenol and 40 parts by weight tetrachloroethane.

The sulfonate-containing, water-dispersible, linear polymers thus comprise polyesters, including polyesteramides, consisting of repeating, alternating residues of (1) one or more dicarboxylic acids and (2) one or more diols or a combination of one or more diols and one or more diamines where, in the preceding definition, the mole percentages are based on 100 mole percent dicarboxylic acid residues and 100 mole percent diol or diol and diamine residues. Alternatively, the polymers may include residues of monomers having mixed functionality such as hydroxycarboxylic acids, aminocarboxylic acids and/or aminoalkanols.

In the above hybrid latexes, the polyester or polyester is preferably present in about 1–40 weight percent, based on the total weight of solids, more preferably 2–20 weight percent, and most preferably 2–6 weight percent.

In the above latexes, hydrophilic monomers include the amides and hydroxy alkyl esters of methacrylic acid and acrylic acids, amides and hydroxy alkyl esters of other ethylenically unsaturated acids. Other hydrophilic monomers include ethylenically unsaturated monomers possessing a carboxylic acid group, for example, acrylic acid, methacrylic acid, and itaconic acid. Other examples include the esters of vinyl alcohol such as vinyl formate, vinyl acetate, vinyl propionate, vinyl butyrate, and vinyl versitate.

Further examples include acrylonitrile, methacrylonitrile, crotonaldehyde, hydroxy-substituted alkyl and aryl acrylates and methacrylates, polyether acrylates and methacrylates, alkyl-phosphato-alkyl acrylates and methacrylates, alkylphosphono-alkyl acrylates, methacrylates, acrylic acid, methacrylic acid, maleic acid, maleic anhydride, N-vinyl pyrrolidone, alkyl and substituted alkyl amides of acrylic acid, methacrylic acid, maleic acid, itaconic acid, acrylamide, and methacrylamide.

Especially preferred hydrophilic monomers include methacrylic acid and hydroxyalkyl (meth)acrylates such as hydroxyethyl (meth)acrylate (HEMA).

In general, such hydrophilic monomers are those which exhibit a solubility of at least 6 g per 100 g of water, with those having at least a solubility of 20 g per 100 g of water being preferred. Most preferably, the hydrophilic monomers will have a solubility of 50 g per 100 g of water.

The hydrophobic monomers used herein are in general less soluble in water and form a polymer which is less hydrophilic than the first stage portion. In general, such hydrophobic monomers are those which exhibit a solubility of less than about 2.0 g per 100 g of water.

In the above latexes, the hydrophobic ethylenically unsaturated species which can be utilized include, for example, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, acetoacetoxy ethyl methacrylate, acetoacetoxy butyl methacrylate, acetoacetoxy ethyl acrylate, carbodiimide methacrylate, alkyl crotonates, vinyl acetate, di-n-butyl maleate, di-octylmaleate, and compounds of the general formula (1)

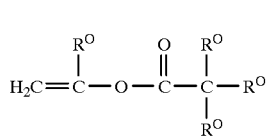

(1)

wherein $R^o$ is independently hydrogen or an alkyl group of up to 12 carbon atoms. Preferably, at least one of $R^o$ is methyl.

Preferred compounds of formula (1) include the following:

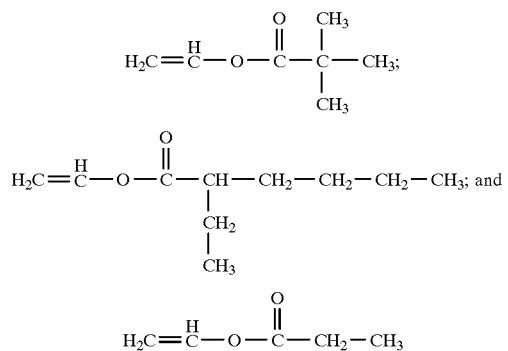

In the above formulae, the alkyl and alkylene groups may be straight or branched chain, and unless otherwise specified contain from one to 12 carbon atoms.

Alternatively, the polymer is prepared using nitrogen containing monomers, preferably the known wet adhesion-promoting monomers, including t-butylaminoethyl methacrylate, dimethylaminoethyl methacrylate, and diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl) ethylene urea, and methacrylamidoethylethylene urea.

In a preferred embodiment, a relatively hydrophilic "seed" or "core" first stage is prepared via emulsion polymerization in the presence of the above described water-dispersible polyesters and polyester-amides. The polyester will generally make up from 1–40 wt % of the total solids of the final latex (i.e. not necessarily the seed). A more preferred range for the polyester content is from 2–20 wt % of the final latex solids while the most preferred level of polyester is 2 to 6 wt %. The first stage seed will generally contain 10–40 wt % of a hydrophilic monomer, with methacrylic acid (MAA), 2-hydroxyethyl methacrylate (HEMA) or some additive combination of the two being the most preferred hydrophilic monomers. Also, combinations of 2-hydroxyethyl acrylate (HEA), HEMA and/or MAA are useful, but generally HEA alone does not yield ultrafine particle size latexes with low levels of coagulum. Selection of the type/ratio of the hydrophilic monomer(s) used in the seed and the ratio of seed monomer to other monomers added later in the reaction (see below) are dictated by both the hydrophobicity of the other comonomers in the seed and the hydrophobicity of those monomers present in the subsequent stages of the latex. For example, when all other factors are held constant (e.g., 1 st stage hydrophobic monomers, 2nd stage composition, level of water dispersible polyester), HEMA-based "seeds" require a higher fraction of hydrophilic monomer and/or a higher fraction of seed relative to the second stage monomer than do the MAA-based "seeds". This is believed to be due to the increased hydrophilicity imparted to the MAA by their partial neutralization at a final pH of about 5–6. The anionic MAA-mers resulting from this partial neutralization would contribute significantly to the overall stability of the latex. Thus, HEMA-based seeds generally require a higher percentage of hydrophilic monomer in overall latex to ensure latex stability. A more preferred range for the hydrophilic monomer(s) is 10–25 wt % in the seed while the most preferred range is 10–20 wt %. The remaining monomers in the seed may be selected from any combination of styrenics, acrylates, and/or methacrylates as described above. A preferred seed composition would contain 10–60 wt % styrene, while the most preferred seed composition would contain 10–40 wt % styrene. The presence of the styrene serves two purposes: (1) its reactivity with both MAA and HEMA assure a relatively random incorporation of these monomers into the seed, and (2) the hydrophobicity of the styrene contributes to the anchoring of the seed to the particle surface, thereby ensuring enhanced latex stability.

The seed monomers will generally make up 5–70 wt % of the total monomer added during the polymerization with a more preferred range being from 15–55 wt %. The appropriate level of seed monomer (i.e., shell polymer) is determined by a number of related factors. Included among these are desired filming characteristics and water resistance. When the weight fraction of shell polymer in latex particle is low, the filming characteristics—most notably, the minimum filming temperature or MFT—of the latex are dominated by the hardness or glass transition temperature (Tg) of the core of the particle. This often results in a need for coalescents and other volatile organic compounds (VOC) to ensure latex film formation. As the weight fraction of shell polymer is increased, the MFT begins to reflect the Tg of the shell alone. This provides an advantage in that lower Tg shells can be used to reduce the demand for coalescents and other VOC while high Tg cores are used to provide desired film hardness and/or toughness. Conversely, because of the relatively high levels of hydrophilic monomer(s) in the shell composition, maximum water and/or corrosion resistance would be best achieved with a lower weight fraction of shell polymer.

The seed may be prepared via either batch and/or semi-continuous methods; however, it is much preferred that the seed be generated via a semi-continuous polymerization at such a rate to assure a monomer-starved process, i.e. monomer essentially reacts as fast as it is added to the reactor. The monomer-starved process works in conjunction with the reactivities of HEMA/MAA with styrene (described above) to assure a more random incorporation of the hydrophilic monomers into the seed particle rather than as a homopolymer in the aqueous phase. Similarly, it is highly preferred that an MAA-based seed be prepared at relatively low pH (pH<4.5) to assure more uniform incorporation of MAA into the seed polymer. Prior to the addition of subsequent stages of monomer, the seed may be further neutralized with an appropriate base; however, this can result in an unwanted increase in final latex particle size, a decrease in reaction rate and/or a decrease in latex stability and is therefore not suggested or preferred.

Subsequent stages of monomer which are added to the previously described seed may, but typically do not contain additional HEMA, MAA, and/or HEA. Monomers that are of particular importance in this invention include styrene, methyl methacrylate, butyl methacrylate, butyl acrylate, 2-ethylhexyl acrylate, ethylhexyl methacrylate, ethyl acrylate, acetoacetoxy ethyl methacrylate, acetoacetoxy butyl methacrylate, acetoacetoxy ethyl acrylate and acrylonitrile. As these subsequent stages of monomer are added, the more hydrophilic nature of the seed results in its migration to the particle surface such that it (i.e., the polymer prepared in the first stage) becomes the "shell" of the particle.

In the polymerization process, any number of free radical initiators (both thermal and redox systems) can be used to generate small particle size latexes. Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above described reducing agents, promote decomposition of the polymerization initiator under the reaction conditions.

Suitable catalysts include transition metal compounds such as, for example, ferrous sulfate heptahydrate, ferrous chloride, cupric sulfate, cupric chloride, cobalt acetate, cobaltous sulfate, and mixtures thereof.

However, due to the negative effect of added electrolyte on the stability of the water-dispersible polyesters used in this invention, it is necessary to minimize the electrolyte content of the latex recipe to minimize coagulum. For this reason, the preferred initiator, as part of a redox pair, is t-butyl hydroperoxide (TBHP). The preferred reductants for redox system used in this invention are sodium formaldehyde sulfoxylate (SFS), isoascorbic acid (IAsA) and ascorbic acid (AsA) with the most preferred reductant being isoascorbic acid. Furthermore, electrolyte sensitivity of the primary stabilizer, i.e., the water-dispersible polyester, necessitates the minimization of electrolytic buffer such as sodium carbonate present during the emulsion polymerization. Therefore, the preferred pH range of the final latex is 3–7, with pH 4–6 being more preferred and pH 5–6 being most preferred. This lower pH also facilitates the random incorporation of MAA units (if any are present) into the seed latex. The final latex may be post-neutralized to the desired pH without any deleterious effects using an appropriate base (e.g. ammonium hydroxide). Finally, though it is not necessary, chain transfer agents such as mercaptans may be used to control the molecular weights of the seed and/or any or all of the subsequent polymerization stages. Exemplary chain transfer agents are butyl mercaptan, mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, and the reactive chain transfer agents taught in U.S. Pat. No. 5,247,040, incorporated herein by reference, in particular, allyl mercaptopropionate, allyl mercaptoacetate, crotyl mercaptopropionate, and crotyl mercaptoacetate.

The ultrafine particle size that is achieved in the absence of highly active small molecule surfactants is unexpected. While utilizing the process described herein, one can obtain small particle size latexes, i.e., about 40 to 100 nm, while producing less coagulum, generally less than 5.0 g per Kg of latex solids. This is particularly true when the level of water-dispersible polyester used is comparable to the levels of other types of more traditional surfactants (<5 wt %) typically used to generate small particle size latexes. Generally, this invention is useful at considerably lower concentrations of the water-dispersible polyester as well as lower overall levels of hydrophilic monomer than is described in U.S. Pat. No. 5,342,877.

One process for preparing these polymers involves charging the water-dispersible polyester or polyester-amide to a reactor, feeding in the hydrophilic monomers for the first stage of the latex under monomer starved conditions. As used herein, the term "starved-feed" or "monomer starved" refers to a process where a mixture of the monomers and separately the initiator are fed into the preheated reaction mixture over a period of time. This process results in better compositional control of the copolymers since a high conversion of monomer to polymer is maintained in the reaction vessel. This process also results in better temperature control of the polymerization. The addition rate and process temperature is optimized for the initiator used. The reaction is preferably conducted at about 65° C. under an inert gas such as nitrogen, and the polymerization is initiated using a free radical redox initiator such as t-butyl peroxide/isoascorbic acid. After the first stage monomers are fed into the reactor, a mixture of monomers, comprised of, for example, styrene, butyl acrylate, and the monomers of which define the second stage (which becomes the core) are fed into the reactor. If desired, a "chaser" charge of one or more initiators may be added to the latex following the addition of the second stage monomer to facilitate reduction of the level of unreacted monomer.

As a further aspect of the present invention there is provided a latex coating composition which comprises the polyester/acrylic hybrid latex polymers as described above, further comprising one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include synthetic silica, available from the Davison Chemical Division of W.R. Grace & Company under the trademark SYLOID®; polypropylene, available from Hercules Inc., under the trademark HER- COFLAT®; synthetic silicate, available from J. M. Huber Corporation under the trademark ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners include the methylene/ethylene oxide associative thickeners and water soluble carboxylated thickeners, for example, those sold under the UCAR POLYPHOBE trademark by Union Carbide.

Several proprietary antifoaming agents are commercially available, for example, under the trademark BRUBREAK of Buckman Laboratories Inc., under the Byk® tradename of BYK Chemie, U.S.A., under the Foamaster® and Nopco® trademarks of Henkel Corp./Coating Chemicals, under the DREWPLUS® trademarks of the Drew Industrial Division of Ashland Chemical Company, under the TRYSOL® and TROYKYD® trademarks of Troy Chemical Corporation, and under the SAG® trademarks of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichlorometbylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazoles, hindered amines, and hindered benzoates, available from American Cyanamid Company under the trademark CYASORB UV, and diethyl-3-acetyl-4-hydroxybenzyl-phosphonate, 4-dodecyloxy-2-hydroxy benzophenone, and resorcinol monobenzoate.

As a further aspect of the present invention, there is provided a coating composition optionally containing one or more of the above-described additives. It may also be desirable to utilize a water-miscible organic solvent and/or coalescing agent. Such solvents and coalescing agents are well known and include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat Nos. 5,349,026 and 5,371,148, incorporated herein by reference.

The above latexes can, of course, be designed to have, for example, free hydroxy and/or carboxy groups. In such cases, additional ingredients can include polyisocyanates, epoxyfunctional crosslinking agents, carbodiimide functional compounds, etc.

(See, for example, J. K. Backus in "High Polymers, Vol. 29, 1977, p. 642–680).

As a further aspect of the present invention, there is provided a coating composition as set forth above, further comprising one or more pigments and\or fillers in a concentration of about 1 to about 70 weight percent, preferably about 30 to about 60 weight percent, based on the total weight of the solids in the composition.

Pigments suitable for use in the coating compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

Upon formulation above, the coating compositions is then applied to the desired substrate or article, e.g., steel, aluminum, wood, gypsum board, or galvanized sheeting (either primed or unprimed), and allowed to air dry. Any coating composition designed for industrial coatings, textile coatings, ink coatings, adhesives, or coatings for plastics are within the scope of the present invention and is included in the term "article". Thus, as a further aspect of the present invention, there is provided an article which has been coated with the coating compositions of the present invention and dried.

The latex compositions of the present invention may be used alone or in combination with other waterborne coating compositions in the form of a blend. Accordingly, as a further aspect of the invention, there is provided a waterborne coating composition comprising a blend of a) water;

b) at least one polyester/acrylic hybrid latex prepared by free radical emulsion polymerization, said latex prepared in two stages, wherein in a first stage, a free radical emulsion polymer is prepared from about 10–40 weight percent of hydrophilic monomers and about 90–60 weight percent of hydrophobic monoethylenically unsaturated monomers, based on the total weight of monomers used, wherein said hydrophobic monoethylenically unsaturated monomers are comprised of at least about 10 weight percent of styrene, in the presence of a water-dispersible sulfonated polyester or polyesteramide; and wherein in a second stage, at least one hydrophobic monomer is free radically polymerized in the presence of the free radical emulsion polymer and the water-dispersible sulfonated polyester or polyester amide from the first stage, wherein the weight of monomers to prepare said first stage comprises about 5 to 70 weight percent of total monomers used.; and c) one or more water-dispersible polymers selected from the group consisting of polyesters, polyester-amides, cellulose esters, alkyds, polyurethanes, epoxy resins, polyamides, acrylics, and vinyl polymers.

The present invention further provides a waterborne ink coating formulation which encompasses (A) at least one polyester/acrylic hybrid latex polymer of the present invention prepared by free-radical emulsion polymerization, in two stages, (B) one or more water-dispersible polymers, (C) an additive, and (D) a solvent or coalescing agent.

The polyester/acrylic hybrid latex polymer (A) is present in an amount of from 30 to 90 wt %, based on the total formulation. A more preferred range is 40 to 80 wt %, based on the total amount of the formulation.

The water-dispersible polymer (B) is exemplified by polyester, polyester-amide, cellulose ester, alkyl, polyurethane, epoxy resin, polyamide, acrylic or vinyl polymer. The preferred water dispersible polymer is a polyester or polyester-amide. An additive (C), in accordance with the present invention is exemplified by pigment, dye, filler, leveling agent, rheology or flow modifier, flooding agent, surfactant, ultraviolet absorbent, tinting pigment, extender, defoaming and anti-foaming agent, anti-settling agent, fungicide and mildewcide, thickening agent, plasticizer. Specific examples of such additives can be found in "Raw Materials Index", National Paint and Coatings Association, 1500 Rhode Island Avenue, NW, Washington, D.C.; as well as in "McCutcheon's Emulsifiers and Surfactants", M.C. Publishing Co., Glenrock, N.J. 1993; in "McCutcheon's Functional Materials", M.C. Publishing Co., Glenrock, N.J. 1993; and in "Technology of Paints, Varnishes and Lacquers", Robert E. Krieger Publishing Co., Huntington, N.Y. 1974. Further, a solvent or coalescing agent (D) may preferably be a water soluble solvent. Such solvents and coalescing agents are well known and are substantially the same as those used in a latex coating composition which are described above. Preferred solvents and coalescing agents are $C_1$–$C_6$ branched or straight chain alcohols such as methanol, ethanol, propanol, isopropanol, butanol and mixtures thereof.

Further, the solids content of the waterborne ink coating formulation of the present invention may be adjusted by the addition of water. The glass transition temperature (Tg) of the polyester/acrylic hybrid latex is preferably between 0 and 150° C., more preferably between 20 and 100° C., and may most preferably be between 20 and 50° C.

The waterborne ink coating formulation shows increased dry rate, good print quality, good rewettability, low foam, good water resistance, good gloss and good heat resistance. In addition, the waterborne ink coating formulation is not particularly sensitive to pH. Thus, the pH of the formulation may be adjusted to include in the formulation pH sensitive additives such as extenders and thickeners.

The present invention further provides a waterborne coating formulation which encompasses (A) at least one polyester/acrylic hybrid latex polymer of the present invention prepared by free-radical emulsion polymerization, in two stages, (B) a solvent or coalescing agent, and (C) optionally an additive. The waterborne coating formulations of the invention are particularly useful as wood coating formulations such as topcoat or sealer formulations.

The polyester/acrylic hybrid latex polymer (A) is present in an amount of from 30 to 90 wt %, based on the total formulation. A more preferred range is 5 to 85 wt %, based on the total amount of the formulation.

In a preferred embodiment, a blend of more than one polyester/acrylic hybrid latex may be used. The polyester/acrylic hybrid latexes in accordance with this embodiment may have different glass transition temperatures.

Further, the solvent or coalescing agent (B) may preferably be a water soluble solvent. Such solvents and coalescing agents are well known and are substantially the same as those used in a latex coating composition which are described above. Preferred solvents and coalescing agents are ethylene glycol monobutyl ether and dipropylene glycol monobutyl ether.

An additive (C), in accordance with the present invention is exemplified by pigment, dye, filler, leveling agent, rheology or flow modifier, flooding agent, surfactant, ultraviolet absorbent, tinting pigment, extender, defoaming and anti-foaming agent, anti-settling agent, fungicide and mildewcide, thickening agent, plasticizer. Specific examples of such additives can be found in "Raw Materials Index", National Paint and Coatings Association, 1500 Rhode Island Avenue, NW, Washington, D.C.; as well as in "McCutcheon's Emulsifiers and Surfactants", M.C. Publishing Co., Glenrock, N.J., 1993; in "McCutcheon's Functional Materials", M.C. Publishing Co., Glenrock, N.J., 1993; and in "Technology of Paints, Varnishes and Lacquers", Robert E. Krieger Publishing Co., Huntington, N.Y., 1974.

The present invention further provides a waterborne coating formulation which encompasses (A) the polyester/acrylic hybrid latex polymer of the present invention prepared by free-radical emulsion polymerization, in two stages, (B) a solvent or coalescing agent, and (C) optionally an additive. The waterborne coating formulations of the invention are particularly useful as wood coating formulations such as topcoat or sealer formulations.

The polyester/acrylic hybrid latex polymer (A) is present in an amount of from 30 to 90 wt %, based on the total formulation. A more preferred range is 5 to 85 wt %, based on the total amount of the formulation.

In a preferred embodiment, a blend of more than one polyester/acrylic hybrid latex may be used. The polyester/acrylic hybrid latexes in accordance with this embodiment may have different glass transition temperatures.

Further, the solvent or coalescing agent (B) may preferably be a water soluble solvent. Such solvents and coalescing agents are well known and are substantially the same as those used in a latex coating composition which are described above. Preferred solvents and coalescing agents are ethylene glycol monobutyl ether and dipropylene glycol monobutyl ether.

An additive (C), in accordance with the present invention is exemplified by pigment, dye, filler, leveling agent, rheology or flow modifier, flooding agent, surfactant, ultraviolet absorbent, tinting pigment, extender, defoaming and anti-foaming agent, anti-settling agent, fungicide and mildewcide, thickening agent, plasticizer. Specific examples of such additives can be found in "Raw Materials Index", National Paint and Coatings Association, 1500 Rhode Island Avenue, NW, Washington, D.C.; as well as in "McCutcheon's Emulsifiers and Surfactants", M.C. Publishing Co., Glenrock, N.J., 1993; in "McCutcheon's Functional Materials", M.C. Publishing Co., Glenrock, N.J., 1993; and in "Technology of Paints, Varnishes and Lacquers", Robert E. Krieger Publishing Co., Huntington, N.Y., 1974.

Further, the solids content of the waterborne coating formulation of the present invention may be adjusted by the addition of water. The glass transition temperature (Tg) of the polyester/acrylic hybrid latex is preferably between 0 and 150° C., more preferably between 20 and 100° C., and most preferably between 20 and 50° C.

EXPERIMENTAL SECTION

PROCEDURE 1

Examples 1 through 11

To a 1000 mL resin kettle equipped with a condenser, nitrogen purge and subsurface feed tubes were added 411 g of water and 42 g of a 32% solids dispersion of a polyester prepared from 82 mol % isophthalic acid, 18 mole % 5-(sodiosulfo)isophthalic acid, 54 mole % diethylene glycol and 46 mole % cyclohexanedimethanol with a Tg of 55° C. and an inherent viscosity of 0.33 in 60/40 phenol/tetrachloroethane. A nitrogen purge was begun and the reactor heated to 55° C. and agitated at 300 rpm. At 55° C., 0.20 g tert-butyl hydroperoxide (TBHP), 0.20 g isoascorbic acid (IAA), 0.55 g of a 1.0% solution of ammonium iron sulfate and 0.30 g of 1.0% solution of diammonium ethylenediaminetetraacetic acid were added to the reactor. The first stage monomer charge was fed over about 25 mins. An initiator/buffer charge of 0.59 g of TBHP and 0.40 g ammonium carbonate in 35.0 g of water and a reductant charge of 0.80 g IAA in 35.0 g of water were also begun and fed at 0.240 g/min. After the first stage addition was completed, the second stage monomer charge was begun and fed over about 100 mins. After all monomer, initiator and reductant feeds were complete, heating was continued for 60–90 minutes. The emulsion was cooled and filtered through a 100 mesh wire screen. The solids level, weight coagulum (collected through the 100 mesh wire screen) and particle size were determined. The composition for each reaction stage and their characterization are shown in Table I.

PROCEDURE 2

Examples 12 and 13

To a 1000 mL resin kettle equipped with a condenser, nitrogen purge and subsurface feed tubes were added 411 g of water and 42 g of a 32% solids dispersion of the polyester described in Procedure 1. A nitrogen purge was begun and the reactor heated to 55° C. and agitated at 300 rpm. At 550° C., 0.20 g tert-butyl hydroperoxide (TBHP), 0.20 g isoascorbic acid (IAA), 0.55 g of a 1.0% solution of ammonium iron sulfate and 0.30 g of 1.0% solution of diammonium ethylenediaminetetraacetic acid were added to the reactor. An initiator/buffer charge of 0.59 g of TBHP and 0.40 g ammonium carbonate in 35.0 g of water and a reductant

TABLE 2

| | Polymer Composition[1] | | | | | |
|---|---|---|---|---|---|---|
| Ex. | S[2] | BA[3] | MAA[4] | HEMA[5] | Part Size[6] | Grams Coagulum |
| 12 | 48.5 | 48.5 | 3 | — | 56 | 12.8 |
| 13 | 48.5 | 48.5 | — | 3 | 57 | 55.0 |

All latexes prepared at 35% solids - 800 gram batches
[1]in parts by weight
[2]S = styrene
[3]BA = butyl acrylate
[4]MAA = methacrylic acid
[5]HEMA = 2-hydroxyethyl methacrylate
[6]MMA = methyl methacrylate
[7]ratio of weight of 1st stage to weight of 2nd stage
[8]average diameter in nanometers Examples 14 and 15

Example 2 from Procedure 1 was prepared with compositional variants of the water-dispersible polyester used as stabilizer. The compositions of these polyesters and selected properties of the resulting latexes are presented in Table 3. These examples demonstrate the potential for controlling the particle size of a given latex by altering not the composition of the latex or the amount of water-dispersible polyester present in the latex but rather the structure/dispersion characteristics of that polyester.

TABLE 3

| | Polymer Composition[1] | | | | Particle | Grams |
|---|---|---|---|---|---|---|
| Ex. | SSIPA[2] | IPA[3] | CHDM[4] | DEG[5] | Size[6] | Coagulum |
| 2 | 18 | 82 | 46 | 54 | 58 | 0.16 |
| 14 | 20 | 80 | 80 | 20 | 65 | 0.03 |
| 15 | 11 | 89 | 24 | 76 | 88 | 0.98 |

All latexes prepared at 35% solids - 800 gram batches
[1]in mole percent of diacid/diol
[2]SSIPA = sodiosulfoisophthalic acid

TABLE 1

| | 1st Stage Monomer[1] | | | | 2nd Stage Monomer[1] | | | 1:2 | PHR[9] Dispersible | Part | grams |
|---|---|---|---|---|---|---|---|---|---|---|---|
| Ex. | S[2] | BA[3] | MAA[4] | HEMA[5] | S[2] | BA[3] | MMA[6] | ratio[7] | Polyester | Size[8] | Coagulum |
| 1 | 35 | 35 | 30 | — | 50 | 50 | — | 0.11 | 5.26 | 53 | 0.52 |
| 2 | 35 | 35 | 30 | — | — | 50 | 50 | 0.20 | 5.26 | 58 | 0.16 |
| 3 | 35 | 35 | 15 | 15 | — | 50 | 50 | 0.20 | 5.26 | 58 | 0.78 |
| 4 | 35 | 35 | — | 30 | — | 50 | 50 | 0.20 | 5.26 | 60 | 1.97 |
| 5 | 45 | 30 | 25 | — | 60 | 40 | — | 0.11 | 5.26 | 55 | 0.11 |
| 6 | 35 | 35 | 30 | — | 50 | 50 | — | 0.25 | 5.26 | 48 | 0.40 |
| 7 | 38 | 37 | 30 | — | — | 50 | 50 | 0.33 | 5.26 | 54 | 0.52 |
| 8 | 38 | 37 | 25 | — | — | 50 | 50 | 0.25 | 5.26 | 53 | 0.85 |
| 9 | 38 | 37 | 25 | — | — | 50 | 50 | 0.20 | 5.26 | 53 | 0.69 |
| 10 | 40 | 40 | 20 | — | — | 50 | 50 | 0.33 | 5.26 | 59 | 0.14 |
| 11 | 35 | 35 | 30 | — | — | 50 | 50 | 0.20 | 3.09 | 76 | 0.71 |

All latexes prepared at 35% solids - 800 gram batches.
[1]in parts by weight
[2]S = styrene
[3]BA = butyl acrylate
[4]MAA = methacrylic acid
[5]HEMA = 2-hydroxyethyl methacrylate
[6]MMA = methyl methacrylate
[7]ratio of weight of 1st stage to weight of 2nd stage
[8]average diameter in nanometers
[9]phr = parts per hundred parts resin (i.e., monomer)

TABLE 3-continued

| | Polymer Composition[1] | | | | Particle | Grams |
|---|---|---|---|---|---|---|
| Ex. | SSIPA[2] | IPA[3] | CHDM[4] | DEG[5] | Size[6] | Coagulum |

[3]IPA = isophthalic acid
[4]CHDM = 1,4-cyclohexane dimethanol
[5]DEG = diethylene glycol
[6]average diameter in nanometers

Example 16

To a 1000 mL resin kettle equipped with a condenser, nitrogen purge and subsurface feed tubes were added 411 g of water and 42 g of a 32% solids dispersion of a water-dispersible polyester described in Procedure 1. A nitrogen purge was begun and the reactor heated to 65° C. and agitated at 300 rpm. At 65° C., 0.14 g tert-butyl hydroperoxide (TBHP), 0.41 g isoascorbic acid (IAA), 0.98 g of a 1.0% solution of ammonium iron sulfate and 0.53 g of 1.0% solution of diammonium ethylenediaminetetraacetic acid were added to the reactor. A first stage monomer mixture of 48.9 g butyl acrylate, 29.9 g styrene, 29.7 g methyl methacrylate, 5.4 g methacrylic acid and 21.8 g of 2-hydroxyethyl acrylate was then fed into the reactor over 65 min. An initiator/buffer charge of 0.77 g of TBHP and 0.54 g ammonium carbonate in 30.0 g of water and a reductant charge of 0.28 g IAA in 30.0 g of water were also begun and fed at 0.230 g/min. After the first stage addition was completed, the second stage monomer mixture of 51.1 g butyl acrylate, 83.7 g methyl methacrylate and 1.36 g trimethylolpropane triacrylate was fed over about 65 min. After all monomer, initiator and reductant feeds were complete, heating was continued for 60–90 minutes. The emulsion was cooled and filtered through a 100 mesh wire screen. The resulting latex had a particle size of 69 nm and yielded 0.70 grams of filtered coagulum.

Example 17

Example 1 from Procedure 1 was repeated with the order of monomer addition reversed, that is, in the presence of the water-dispersible polyester, the hydrophobic stage was prepared first and the hydrophilic stage second. This should result in the same general hydrophilic shell/hydrophobic core particle structure as does the inverted core-shell process; however, because the hydrophilic stage was prepared late in the reaction, it would be incapable of acting as a costabilizer with the water-dispersible polyester during the preparation of the hydrophobic core. The data presented in Table 4 suggests that for these surfactant-free water-dispersible polyester stabilized latexes, the in-situ generation of a costabilizer via the inverted core-shell process is crucial for preparation of stable latex compositions. Also, as with Examples 12 and 13, the importance of the water-dispersible polyester in generating ultra-fine particle size latexes is demonstrated.

TABLE 4

| | 1st Stage Monomer[1] | | | 2nd Stage Monomer[1] | | | 1:2 | Part | grams |
|---|---|---|---|---|---|---|---|---|---|
| Ex. | S | BA | MAA | S | BA | MAA | ratio | Size | Coagulum |
| 1 | 35 | 35 | 30 | 50 | 50 | — | 0.11 | 53 | 0.52 |
| 17 | 50 | 50 | — | 35 | 35 | 30 | 9.00 | 56 | >100 |

All latexes prepared at 35% solids - 800 gram batches.
[1]in part by weight
[2]average diameter in mm

PROCEDURE 3

Example 18

To a 1000 mL resin kettle equipped with a condenser, nitrogen purge and subsurface feed tubes were added 375 g water and 0.83 g 1.0% sodium dodecyl sulfate solution. A nitrogen purge was begun and the reactor heated to 55° C. and agitated at 300 rpm. At 55° C., 0.10 g ammonium persulfate (APS), 0.10 g sodium bisulfite (SBS), 0.55 g of a 1.0% solution of ammonium iron sulfate and 0.30 g of 1.0% solution of diammonium ethylenediamine-tetraacetic acid were added to the reactor. An initiator charge of 1.12 g APS in 50.0 g of water was begun at 0.341 g/min and a reductant charge of 0.59 g SBS in 15.0 g of water was begun at 0.624 g/min. A first stage monomer charge comprised of 66.1 g of water, 3.33 g of 1.0% sodium dodecyl sulfate solution, 0.86 g of 10% sodium hydroxide solution, 8.41 g of butyl acrylate, 12.61 g of styrene and 7.00 g of methacrylic acid was added over 25 mins. When the first stage addition was complete, the reactor was heated to 75° C. and a second stage charge of 100.8 g of butyl acrylate and 151.2 g of styrene was added over approximately 2 hours. The resulting latex was not stable as evidenced by almost total coagulation of the latex.

This example represents our closest one-pot approximation to the multi-step method described by Lambla, *J. Appl. Polymer Sci.*, 44, 1075 (1992). The lack of stability in our material indicates a less-than-optimum single pot recipe for comparison to the Lambla latexes; however, enough latex was isolated from Example 17 to determine a particle size. At 258 nm, the particle size of Example 18 is very close to those described by Lambla in his system (approximately 250 nm). Example 5 is an iso-composition water-dispersible polyester containing version of the latex described in Example 18. Comparison of Examples 5 and 18 serves to further illustrate that the water-dispersible polyester is a major contributor to small particle size observed in these systems.

PROCEDURE 4

Example 19

To a 1000 mL resin kettle equipped with a condenser, nitrogen purge and subsurface feed tubes were added 422 g of water and 42 g of a 32% solids dispersion of the polyester described in Procedure 1. A nitrogen purge was begun and the reactor heated to 55° C. and agitated at 300 rpm. At 55° C., 0.20 g tert-butyl hydroperoxide (TBHP), 0.20 g isoascorbic acid (IAA), 0.55 g of a 1.0% solution of ammonium iron sulfate and 0.30 g of 1.0% solution of diammonium ethylenediaminetetraacetic acid were added to the reactor. An initiator/buffer charge of 0.59 g of TBHP and 0.40 g ammonium carbonate in 35.0 g of water and a reductant charge of 0.80 g IAA in 35.0 g of water were begun and fed at 0.260 g/min. The first stage monomer charge of 7.48 g butyl acrylate, 7.49 g of styrene and 6.41 g of methacrylic acid was begun at a rate such that a monomer-starved process would be maintained. After the 1 st stage addition was complete, the reaction was held for 15 mins at which time 3.80 g of 28% ammonium hydroxide was added dropwise to the reactor. Following neutralization of the seed latex, the second stage monomer charge of 84.7 g of butyl acrylate and 107.8 g of styrene was begun at approximately 1.5 to 2 times the feed rate of the first stage. A significant increase in latex particle size relative to previous runs in which the seed had remained unneutralized was observed during the addition of the second stage monomer. Following the addition of the second stage monomers, catastrophic coagulation of the latex occurred, thereby preventing further analysis of the material.

The purpose of this example is to demonstrate that neutralization of the acid-functional 1st stage polymer prior to the addition of subsequent stages of monomer is not only unnecessary, but can in fact be detrimental to the stability of the polyester-acrylic hybrid latex.

Example 20

To a 1000 mL resins kettle equipped with a condenser, nitrogen purge and subsurface feed tubes were added 351 g of water and 51 g of a 32% solids dispersion of a polyester prepared from 82 mol % is isophthalic acid, 18 mol % 5-(sodiosulfo)isophthalaic acid, 54 mol % diethylene glycol and 46 mol % cyclohexanedimethanol with a Tg of 55° C. and an inherent viscosity of 0.33 in 60/40 phenol/tetrachloroethane. A first stage monomer charge containing 29.3 g MMA, 4.6 g styrene, 11.4 g MAA, and 1.6 g methyl 3-mercaptopropionate (MMP) was prepared. A nitrogen purge was begun and the reactor heated to 65° C. and agitated at 300 rpm. An initiator/buffer charge of 1.26 g of TBHP and 0.62 g ammonium carbonate in 44.1 g of water and a reductant charge of 1.44 g sodium formaldehyde sulfoxylate (SFS) in 44.6 g of water were also prepared. At 65° C., 10 g of the first stage monomer charge, 0.60 g of a 1.0% solution of ammonium iron sulfate and 0.50 g of 1.0% solution of diammonium ethylenediaminetetraacetic acid were added to the reactor along with 6.9 g of the initiator solution and 6.9 g of the reductant solution. After a hold period of 10 minutes, the initiator and reductant feeds were begun at a rate of 0.56 g/minute and the remainder of the first stage monomer mixture was fed at a rate of 1.23 g/minute. At the completion of the first stage monomer feed, a second stage feed composed of 257.0 g of styrene was fed to the reactor at a rate of 6.43 g/minute. After all monomer, initiator and reductant feeds were complete, heating was continued for 30 minutes, at which time a chaser of 0.20 g TBHP in 2.5 g of water and 0.10 g SFS in 2.5 g of water were added to the reactor. The resulting latex was cooled and filtered through a 100 mesh wire screen.

Example 21

To a 1000 mL resin kettle equipped with a condenser, nitrogen purge and subsurface feed tubes were added 336 g of water and 54 g of a 30% solids dispersion of a polyester prepared from 89 mol % isophthalic acid, 11 mol % 5-(sodiosulfo)isophthalic acid, 74 mol % diethylene glycol and 26 mol % cyclohexanedimethanol with a Tg of 38° C. and an inherent viscosity of 0.33 in 60/40 phenol/tetrachloroethane. A first stage monomer charge containing 57.5 g 2-ethylhexyl acrylate (EHA), 18.0 g styrene 30.3 g MAA, and 13 g of this monomer mixture were set aside. To the remaining monomer mixture, 2.20 g of methyl 3-mercaptopropionate was added. A nitrogen purge was begun and the reactor heated to 65° C. and agitated at 300 rpm. An initiator/buffer charge of 1.00 g of TBHP and 1.10 g ammonium carbonate in 47.9 g of water and a reductant charge of 1.00 g IAA in 46.5 g of water were also prepared. At 65° C., the previously set aside 13.0 g of the first stage monomer mixture, 1.20 g of a 1.0% solution of ammonium iron sulfate and 0.60 g of 1.0% solution of diammonium ethylenediaminetetraacetic acid were added to the reactor along with 10.0 g of the initiator solution and 7.5 g of the reductant solution. After a hold period of 30 minutes, the reactor and reductant feeds were begun at a rate of 0.27 g/minute and the remainder of the first stage monomer mixture was fed at a rate of 1.46 g/minute. At the completion of the first stage monomer feed, a second stage feed composed of 196.9 g of styrene was fed to the reactor at a rate of a 2.32 g/minute. After all monomer, initiator and reductant feeds were complete, heating was continued for 30 minutes, at which time a chaser of 0.45 g TBHP in 15.0 g of water were added to the reactor. The resulting latex was cooled and filtered through a 100 mesh wire screen.

Example 22

To a 1000 mL resin kettle equipped with a condenser, nitrogen purge and subsurface feed tubes were added 310 g of water, and 28 g of a 30% solids dispersion of a polyester prepared from 89 mol % isophthalic acid, 11 mol % 55-(sodiosulfo)isophthalic acid, 74 mol % diethylene glycol and 26 mol % cyclohexanedimethanol with a Tg of 38° C. and an inherent viscosity of 0.333 in 60/40 phenol/tetrachloroethane. A first stage monomer charge containing 57.4 g-2-ethylhexyl acrylate (EHA), 9.6 g styrene, 28.7 g MAA, and 0.8 g methyl 3-mercaptopropionate (MMP) was prepared, and 29.0 g of this monomer mixture were set aside. A nitrogen purge was begun and the reactor heated to 65° C. and agitated at 300 rpm. An initiator/buffer charge of 0.80 g of TBHP and 0.70 g ammonium carbonate in 35.0 g of water and a reductant charge of 0.80 g IAA in 35.0 g of water were also prepared. At 65° C., the previously set aside 29.0 g of first stage monomer mixture, 1.0 g of MMP, 0.55 g of a 1.0% solution of ammonium iron sulfate and 0.30 g of 1.0% solution of diammonium ethylenediaminetetraacetic acid were added to the reactor along with 0.20 g IAA in 5.0 g water and 0.20 g TBHP in 5.0 grams water. The initiator and reductant feeds were begun immediately at a rate of 0.20 g/minute. After a hold period of 10 minutes, the remainder of the first stage monomer mixture was fed at a rate of 0.95 g/minute. At the completion of the first stage monomer feed, a second stage feed composed of 49.7 g butyl acrylate, 46.1 g of styrene, and 81.6 g MMA was fed to the reactor at a rate of 1.90 g/minute. After all monomer, initiator and reductant feeds were complete, heating was continued for 2 hours. The resulting latex was cooled and filtered through a 100 mesh wire screen.

Example 23

To a 4000 mL resin kettle equipped with a condenser, nitrogen purge and subsurface feed tubes were added 1928 g of water, 23.1 g of ARCOSOLV PnP (monopropyl ether of propylene glycol), and 108.3 g of a 32% solids dispersion of a polyester prepared from 82 mol % isophthalic acid, 18 mol % 5-(sodiosulfo)isophthalic acid, 54 mol % diethylene glycol and 46 mol % cyclohexanedimethanol with a Tg of 55° C. and an inherent viscosity of 0.33 in 60/40 phenol/tetrachloroethane. A nitrogen purge was begun and the reactor heated to 65° C. and agitated at 300 rpm. At 65° C., 0.78 g tert-butyl hydroperoxide (TBHP), 1.94 g isoascorbic acid (IAA), 4.31 g of a 1.0% solution of ammonium iron sulfate and 2.33 g of 1.0% solution of diammonium ethylenediaminetetraacetic acid were added to the reactor. A first stage monomer charge consisting of 152.7 g butyl acrylate, 80.5 g styrene, 58.3 g methacrylic acid, and 1.46 g ethylhexyl 3-mercaptopropionate was fed over about 50 minutes. An initiator/buffer charge of 3.11 g of TBHP and 2.33 g ammonium carbonate in 120.0 g of water and a reductant charge of 0.97 g IAA in 120.0 g of water were also begun and fed at 0.90 g/min. After the first stage addition was completed, a second stage monomer charge consisting of 748.7 g of methyl methacrylate and 128.8 g of butyl acrylate was begun and fed over about 75 minutes. After all monomer, initiator and reductant feeds were complete, heating was continued for 60–90 minutes. The emulsion was cooled and filtered through a 100 mesh wire screen, yielding 0.3 of coagulum. The resulting translucent dispersion had a solids level of 35% and a particle size of 58 nm.

Example 24

To a 4000 mL resin kettle equipped with a condenser, nitrogen purge and subsurface feed tubes were added 1928 g of water, 23.1 g of ARCOSOLV PnP (monopropyl ether of propylene glycol), and 108.3 g of a 32% solids dispersion of the polyester described in Example 23. A nitrogen purge was begun and the reactor heated to 65° C. and agitated at 300 rpm. At 65° C., 0.78 g tert-butyl hydroperoxide (TBHP), 1.94 g isoascorbic acid (IAA), 4.31 g of a 1.0% solution of ammonium iron sulfate and 2.33 g of 1.0% solution of diammonium ethylenediaminetetraacetic acid were added to the reactor. A first stage monomer charge consisting of 144.5 g butyl acrylate, 80.5 g styrene, 58.3 g methacrylic acid, and 1.46 g ethylhexyl-3-mercaptopropionate was fed over about 50 minutes. An initiator/buffer charge of 3.11 g of TBHP and 2.33 g ammonium carbonate in 120.0 g of water and a reductant charge of 0.97 g IAA in 120.0 g of water were also begun and fed at 0.90 g/min. After the first stage addition was completed, a second stage monomer charge consisting of 565.6 g of methyl methacrylate and 317.3 g of butyl acrylate was begun and fed over about 75 minutes. After all monomer, initiator and reductant feeds were complete, heating was continued for 60–90 minutes. The emulsion was cooled and filtered through a 100 mesh wire screen, yielding 1.2 of coagulum. The resulting translucent dispersion had a solids level of 35% and a particle size of 69 nm.

Example 25

To a 4000 mL resin kettle equipped with a condenser, nitrogen purge and subsurface feed tubes were added 1928 g of water, 23.1 g of ARCOSOLV PnP (monopropyl ether of propylene glycol), and 108.3 g of a 32% solids dispersion of the polyester described in Example 23. A nitrogen purge was begun and the reactor heated to 65° C. and agitated at 300 rpm. At 65° C., 0.78 g tert-butyl hydroperoxide (TBHP), 1.94 g isoascorbic acid (IAA), 4.31 g of a 1.0% solution of ammonium iron sulfate and 2.33 g of 1.0% solution of diammonium ethylenediaminetetraacetic acid were added to the reactor. A first stage monomer charge consisting of 267.2 g butyl acrylate, 145.8 g styrene, 23.3 g methacrylic acid, 93.3 g 2-hydroxyethyl methacrylate, and 2.92 g ethylhexyl-3-mercaptopropionate was fed over about 65 minutes. An initiator/buffer charge of 3.11 g of TBHP and 2.33 g ammonium carbonate in 120.0 g of water and a reductant charge of 0.97 g IAA in 120.0 g of water were also begun and fed at 0.90 g/min. After the first stage addition was completed, a second stage monomer charge consisting of 412.8 g of methyl methacrylate and 170.1 g of butyl acrylate was begun and fed over about 65 minutes. After all monomer, initiator and reductant feeds were complete, heating was continued for 60–90 minutes. The emulsion was cooled and filtered through a 100 mesh wire screen, yielding 0.7 of coagulum. The resulting translucent dispersion had a solids level of 35% and a particle size of 61 nm.

Example 26

To a 1000 mL resin kettle equipped with a condenser, nitrogen purge and subsurface feed tubes were added 409 g of water, 6.8 g of ARCOSOLV PnP (monopropyl ether of propylene glycol), and 27.1 g of a 32% solids dispersion of the polyester described in Example 23. A first stage monomer charge containing 36.6 grams 2-ethylhexyl acrylate (EHA), 20.1 g styrene, 14.2 g MAA, and 0.35 g ethylhexyl 3-mercaptopropionate was prepared, and 8.5 grams of this monomer mixture were set aside. A nitrogen purge was begun and the reactor heated to 65° C. and agitated at 300 rpm. An initiator/buffer charge of 0.76 g of TBHP and 1.00 g ammonium carbonate in 35.0 g of water and a reductant charge of 0.68 g IAA in 35.0 g of water were also prepared. At 65° C., the previously set-aside 8.5 g of the first stage monomer mixture, 0.19 g tert-butyl hydroperoxide (TBHP), 0.17 g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 minutes, the initiator and reductant feeds were begun at a rate of 0.30 g/min and the remaining first stage monomer mixture was fed at a rate of 1.42 g/min. At the completion of the first stage monomer feed, a second stage feed composed of 114.6 grams of methyl methacrylate and 97.9 grams of ethylhexyl acrylate was fed to the reactor at a rate of 2.80 g/min. After all monomer, initiator and reductant feeds were complete, heating was continued for 30 minutes, at which time a chaser of 0.45 g TBHP in 10.0 grams of water were added to the reactor. The resulting latex was cooled and filtered through a 100 mesh wire screen, yielding 1.2 g coagulum. The resulting translucent dispersion had a solids level of 36% and a particle size of 76 nm.

Example 27

To a 1000 mL resin kettle equipped with a condenser, nitrogen purge and subsurface feed tubes were added 409 g of water, 6.8 g of ARCOSOLV PnP (monopropyl ether of propylene glycol), and 27.1 g of a 32% solids dispersion of the polyester described in Example 23. A first stage monomer charge containing 36.6 grams 2-ethylhexyl acrylate (EHA), 20.1 g styrene, 14.2 g MAA, and 0.35 g ethylhexyl-3-mercaptopropionate was prepared, and 8.5 grams of this monomer mixture were set aside. A nitrogen purge was begun and the reactor heated to 65° C. and agitated at 300 rpm. An initiator/buffer charge of 0.76 g of TBHP and 1.00 g ammonium carbonate in 35.0 g of water and a reductant charge of 0.68 g IAA in 35.0 g of water were also prepared. At 65° C., the previously set-aside 8.5 g of the first stage monomer mixture, 0.19 g tert-butyl hydroperoxide (TBHP), 0.17 g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 minutes, the initiator and reductant feeds were begun at a rate of 0.30 g/min and the remaining first stage monomer mixture was fed at a rate of 1.42 g/min. At the completion of the first stage monomer feed, a second stage feed composed of 95.1 grams of methyl methacrylate, 95.1 grams of styrene, and 22.1 grams of ethylhexyl acrylate was fed to the reactor at a rate of 2.80 g/min. After all monomer, initiator and reductant feeds were complete, heating was continued for 30 minutes, at which time a chaser of 0.45 g TBHP in 10.0 grams of water were added to the reactor. The resulting latex was cooled and filtered through a 100 mesh wire screen, yielding 0.7 g coagulum. The resulting translucent dispersion had a solids level of 36% and a particle size of 77 nm.

Example 28

To a 1000 mL resin kettle equipped with a condenser, nitrogen purge and subsurface feed tubes were added 408 g of water and 27.1 g of a 32% solids dispersion of the polyester described in Example 23. A first stage monomer charge containing 36.2 grams 2-ethylhexyl acrylate (EHA), 20.0 g styrene, 14.0 g MAA, and 0.34 g ethylhexyl-3-mercaptopropionate was prepared, and 8.5 grams of this monomer mixture were set aside. A nitrogen purge was begun and the reactor heated to 65° C. and agitated at 300 rpm. An initiator/buffer charge of 0.76 g of TBHP and 1.00 g ammonium carbonate in 35.0 g of water and a reductant charge of 0.68 g IAA in 35.0 g of water were also prepared. At 65° C., the previously set-aside 8.5 g of the first stage monomer mixture, 0.19 g tert-butyl hydroperoxide (TBHP), 0.17 g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 minutes, the initiator and reductant feeds were begun at a rate of 0.30 g/min and the remaining first stage monomer mixture was fed at a rate of 1.42 g/min. At the completion of the first stage monomer feed, a second stage feed composed of 100.4 grams of methyl methacrylate and 110.1 grams of butyl acrylate was fed to the reactor at a rate of 2.80 g/min. After all monomer, initiator and reductant feeds were complete, heating was continued for 30 minutes, at which time a chaser of 0.45 g TBHP in 5.0 grams of water were added to the reactor. The resulting latex was cooled and filtered through a 100 mesh wire screen, yielding 0.4 g coagulum. The resulting translucent dispersion had a solids level of 36% and a particle size of 67 nm.

Example 29

To a 1000 mL resin kettle equipped with a condenser, nitrogen purge and subsurface feed tubes were added 408 g of water and 27.1 g of a 32% solids dispersion of the polyester described in Example 23. A first stage monomer charge containing 36.2 grams 2-ethylhexyl acrylate (EHA), 20.0 g styrene, 14.0 g MAA, and 0.34 g ethylhexyl-3-mercaptopropionate was prepared, and 8.5 grams of this monomer mixture were set aside. A nitrogen purge was begun and the reactor heated to 65° C. and agitated at 300 rpm. An initiator/buffer charge of 0.76 g of TBHP and 1.00 g ammonium carbonate in 35.0 g of water and a reductant charge of 0.68 g IAA in 35.0 g of water were also prepared. At 65° C., the previously set-aside 8.5 g of the first stage monomer mixture, 0.19 g tert-butyl hydroperoxide (TBHP), 0.17 g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 minutes, the initiator and reductant feeds were begun at a rate of 0.30 g/min and the remaining first stage monomer mixture was fed at a rate of 1.42 g/min. At the completion of the first stage monomer feed, a second stage feed composed of 180.5 grams of methyl methacrylate and 29.9 grams of butyl acrylate was fed to the reactor at a rate of 2.80 g/min. After all monomer, initiator and reductant feeds were complete, heating was continued for 30 minutes, at which time a chaser of 0.45 g TBHP in 5.0 grams of water were added to the reactor. The resulting latex was cooled and filtered through a 100 mesh wire screen, yielding 0.1 g coagulum. The resulting translucent dispersion had a solids level of 36% and a particle size of 64 nm.

Example 30

To a 1000 mL resin kettle equipped with a condenser, nitrogen purge and subsurface feed tubes were added 410 g of water and 38.5 g of a 30% solids dispersion of the polyester described in Example 9. A first stage monomer charge containing 31.9 grams 2-ethylhexyl acrylate (EHA), 37.3 g styrene, 9.3 g MMA, 19.6 g MAA, and 0.49 g ethylhexyl-3-mercaptopropionate was prepared, and 9.9 grams of this monomer mixture were set aside. A nitrogen purge was begun and the reactor heated to 65° C. and agitated at 300 rpm. An initiator/buffer charge of 0.75 g of TBHP and 0.98 g ammonium carbonate in 30.0 g of water and a reductant charge of 0.69 g IAA in 30.0 g of water were also prepared. At 65° C., the previously set-aside 8.5 g of the first stage monomer mixture, 0.19 g tert-butyl hydroperoxide (TBHP), 0.17 g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 minutes, the initiator and reductant feeds were begun at a rate of 0.26 g/min and the remaining first stage monomer mixture was fed at a rate of 1.73 g/min. At the completion of the first stage monomer feed, a second stage feed composed of 65.7 grams of styrene, 65.7 grams of methyl methacrylate and 51.0 grams of butyl acrylate was fed to the reactor at a rate of 2.60 g/min. After all monomer, initiator and reductant feeds were complete, heating was continued for 30 minutes, at which time a chaser of 0.45 g TBHP in 10.0 grams of water were added to the reactor. The resulting latex was cooled and filtered through a 100 mesh wire screen, yielding 0.1 g coagulum. The resulting translucent dispersion had a solids level of 36% and a particle size of 109 nm.

Example 31

To a 1000 mL resin kettle equipped with a condenser, nitrogen purge and subsurface feed tubes were added 410 g of water and 38.5 g of a 30% solids dispersion of the polyester described in Example 16. A first stage monomer charge containing 35.4 grams butyl acrylate, 24.3 g styrene, 3.5 grams hydroxyethyl methacrylate, and 19.6 g MAA was prepared, and 8.4 grams of this monomer mixture were set aside. A nitrogen purge was begun and the reactor heated to 65° C. and agitated at 300 rpm. An initiator/buffer charge of 0.75 g of TBHP and 0.98 g ammonium carbonate in 40.0 g of water and a reductant charge of 0.69 g IAA in 30.0 g of water were also prepared. At 65° C., the previously set-aside 8.4 g of the first stage monomer mixture, 0.19 g tert-butyl hydroperoxide (TBHP), 0.17 g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 mins, the initiator and reductant feeds were begun at rates of 0.35 and 0.26 g/min, respectively, and the remaining first stage monomer mixture was fed at a rate of 1.37 g/min. At the completion of the first stage monomer feed, a second stage feed composed of 21.1 grams of styrene, 85.3 grams of methyl methacrylate and 102.1 grams of butyl acrylate was fed to the reactor at a rate of 2.81 g/min. After all monomer, initiator and reductant feeds were complete, heating was continued for 30 minutes, at which time a chaser of 0.45 g TBHP in 10.0 grams of water were added to the reactor. The resulting latex was cooled and filtered through a 100 mesh wire screen, yielding 0.6 g coagulum. The resulting dispersion had a solids level of 36% and a particle size of 75 nm.

Example 32
Formulation with Polycarbodiimide Crosslinker

The latex from Example 31 was neutralized to pH 9.0 with 50% aqueous dimethylethanol amine (DMEA) and formulated with 20 phr (parts per hundred parts of polymer solids) of an 85/15 blend of Eastman EB/Eastman DB. To this formulation, three and six phr Ucarlink XL29SE polycarbodiimide (Union Carbide) were added. These samples and a crosslinker-free control were coated 5 mils wet onto chromate treated aluminum, dried for 30 mins at RT and an additional 30 mins at 65° C. The panels were subjected to a 2 hour spot test with a 50/50 blend of water and ethanol, the solvent removed, and the degree of film whitening evaluated. The crosslinker-free control whitened considerably over the entire solvent coverage area, recovering in approximately 6 mins. The film containing 3 phr XL29SE sample had a slight fog around the rim of the watch glass used to keep the solvent from evaporating—the remainder of the coverage area was not affected. This whitened ring recovered in less than 2 mins following solvent removal. The film containing 6 phr XL29SE showed no apparent whitening.

Example 33

To a 1000 mL resin kettle equipped with a condenser, nitrogen purge and subsurface feed tubes were added 408 g of water and 27.1 g of a 32% solids dispersion of the polyester described in Example 16. A first stage monomer charge containing 36.2 grams 2-ethylhexyl acrylate (EHA), 20.0 g styrene, 14.0 g MAA, and 0.34 g ethylhexyl 3-mercaptopropionate was prepared, and 8.5 grams of this monomer mixture were set aside. A nitrogen purge was begun and the reactor heated to 65° C. and agitated at 300 rpm. An initiator/buffer charge of 0.76 of TBHP and 1.00 g ammonium carbonate in 35.0 g of water and a reductant charge of 0.68 g IAA in 35.0 g of water were also prepared. At 65° C., the previously set-aside 8.5 g of the first stage monomer mixture, 0.19 g tert-butyl hydroperoxide (TBHP), 0.17g isoascorbic acid (IAA), 1.03 g of a 1.0% solution of ammonium iron sulfate and 0.56 g of 1.0% solution of diammonium ethylenediaminetetraacetic acid were added to the reactor. After a hold period of 15 mins, the initiator and reductant feeds were begun at a rate of 0.30 g/min and the remaining first stage monomer mixture was fed at a rate of 1.42 g/min. At the completion of the first stage monomer feed, a second stage feed composed of 180.5 grams of methyl methacrylate and 29.9 grams of butyl acrylate was fed to the reactor at a rate of 2.80 g/min. After all monomer, initiator and reductant feeds were complete, heating was continued for 30 minutes, at which time a chaser of 0.45 g TBHP in 5.0 grams of water were added to the reactor. The resulting latex was cooled and filtered through a 100 mesh wire screen, yielding 0.1 g coagulum. The resulting translucent dispersion had a solids level of 36% and a particle size of 64 nm.

Example 34

Latex with Shell/Core Ratio (SCR)=0.33 and Overall Tg=40° C.

To a 1000 mL resin kettle equipped with a condenser, nitrogen purge and subsurface feed tubes were added 509.5 g of water and 34.4 g of a 32% solids dispersion of the polyester described in Example 16. A first stage monomer charge containing 48.0 grams butyl acrylate (BA), 27.7 g styrene, 8.9 g MAA, and 4.5 g 2-hydroxyethyl methacrylate was prepared, and 10.7 grams of this monomer mixture were set aside. A nitrogen purge was begun and the reactor heated to 65° C. and agitated at 300 rpm. An initiator/buffer charge of 0.95 g of TBHP and 0.89 g ammonium carbonate in 50.0 g of water and a reductant charge of 0.85 g IAA in 35.0 g of water were also prepared. At 65° C., the previously set-aside 10.7 g of the first stage monomer mixture, 0.24 g tert-butyl hydroperoxide (TBHP), 0.24 g isoascorbic acid (IAA), 1.42 g of a 1.0% solution of ammonium iron sulfate and 0.75 g of 1.0% solution of diammonium ethylenediaminetetraacetic acid were added to the reactor. After a hold period of 15 mins, the initiator and reductant feeds were begun at rates of 0.29 and 0.20 g/min, respectively, and the remaining first stage monomer mixture was fed at a rate of 1.17 g/min. At the completion of the first stage monomer feed, a second stage feed composed of 182.1 grams of methyl methacrylate and 84.9 grams of butyl acrylate was fed to the reactor at a rate of 2.36 g/min. After all monomer, initiator and reductant feeds were complete, heating was continued for 30 minutes, at which time a chaser of 0.5 g TBHP in 5.0 grams of water were added to the reactor. The resulting latex was cooled and filtered through a 100 mesh wire screen, yielding 1.1 g coagulum. The resulting translucent dispersion had a solids level of 36.5% and a particle size of 86 nm.

Example 35

Latex with Shell/Core Ratio (SCR)=0.66 and Overall Tg=40° C.

To a 1000 mL resin kettle equipped with a condenser, nitrogen purge and subsurface feed tubes were added 509.5 g of water and 34.4 g of a 32% solids dispersion of the polyester described in Example 16. A first stage monomer charge containing 76.8 grams butyl acrylate (BA), 44.3 g styrene, 14.2 g MAA, and 7.1 g 2-hydroxyethyl methacrylate was prepared and 11.4 grams of this monomer mixture were set aside. A nitrogen purge was begun and the reactor heated to 65° C. and agitated at 300 rpm. An initiator/buffer charge of 0.95 g of TBHP and 0.89 g ammonium carbonate in 50.0 g of water and a reductant charge of 0.85 g IAA in 35.0 g of water were also prepared. At 65° C., the previously set-aside 11.4 g of the first stage monomer mixture, 0.24 g tert-butyl hydroperoxide (TBHP), 0.24 g isoascorbic acid (IAA), 1.42 g of a 1.0% solution of ammonium iron sulfate and 0.75 g of 1.0% solution of diammonium ethylenediaminetetraacetic acid were added to the reactor. After a hold period of 15 mins, the initiator and reductant feeds were begun at rates of 0.29 and 0.20 g/min, respectively, and the remaining first stage monomer mixture was fed at a rate of 1.51 g/min. At the completion of the first stage monomer feed, a second stage feed composed of 156.8 grams of methyl methacrylate and 56.8 grams of butyl acrylate was fed to the reactor at a rate of 2.30 g/min. After all monomer, initiator and reductant feeds were complete, heating was continued for 30 minutes, at which time a chaser of 0.5 g TBHP in 5.0 grams of water were added to the reactor. The resulting latex was cooled and filtered through a 100 mesh wire screen, yielding 0.6 g coagulum. The resulting translucent dispersion had a solids level of 36.4% and a particle size of 65 nm.

Example 36

Latex with Shell/Core Ratio (SCR)=1.22 and Overall Tg=40° C.

To a 1000 mL resin kettle equipped with a condenser, nitrogen purge and subsurface feed tubes were added 509.5 g of water and 34.4 g of a 32% solids dispersion of the polyester described in Example 16. A first stage monomer charge containing 105.4 grams butyl acrylate (BA), 60.8 g styrene, 19.6 g MAA, and 9.8 g 2-hydroxyethyl methacrylate was prepared, and 11.7 grams of this monomer mixture were set aside. A nitrogen purge was begun and the reactor heated to 65° C. and agitated at 300 rpm. An initiator/buffer charge of 0.95 g of TBHP and 0.89 g ammonium carbonate in 50.0 g of water and reductant charge of 0.85 g IAA in 35.0 g of water were also prepared. At 65° C., the previously set-aside 11.7 g of the first stage monomer mixture, 0.24 g tert-butyl hydroperoxide (TBHP), 0.24 g isoascorbic acid (IAA), 1.42 g of a 1.0% solution of ammonium iron sulfate and 0.75 g of 1.0% solution of diammonium ethylenediaminetetraacetic acid were added to the reactor. After a hold period of 15 mins, the initiator and reductant feeds were begun at rates of 0.29 and 0.20 g/min, respectively, and the remaining first stage monomer mixture was fed at a rate of 1.61 g/min. At the completion of the first stage monomer feed, a second stage feed composed of 132.3 grams of methyl methacrylate and 28.1 grams of butyl acrylate was fed to the reactor at a rate of 2.43 g/min. After all monomer, initiator and reductant feeds were complete, heating was continued for 30 minutes, at which time a chaser of 0.5 g TBHP in 5.0 grams of water were added to the reactor. The resulting latex was cooled and filtered through a 100 mesh wire screen, yielding 0.8 g coagulum. The resulting translucent dispersion had a solids level of 36.3% and a particle size of 66 nm.

Example 37

Effect of Shell/Core Ratio (SCR) on MFT/Coalescent Demand

The latexes described in Examples 34 through 36 represent a series in which the ratio of shell polymer to core polymer was varied from 0.33 to 1.22. The composition of the shell polymer (calculated Tg 15° C.) remained constant within this series while the composition of the core polymer varied such that the calculated Tg for a theoretical blend or homogeneous polymer of the two stages was 40° C. The result is that the latex with the thinnest shell has a significantly lower Tg core than do the latexes with thicker shells. These materials were neutralized to pH 8.5 and formulated with varying levels of and 85/15 blend of Eastman Ektasolve EB and benzyl alcohol. Minimum film formation temperatures (MFT) of the latex formulations were then determined. The results are presented in Table Y.

| | MFT | | |
|---|---|---|---|
| PHR Cosolvent | SCR = 0.33 | SCR = 0.66 | SCR = 1.22 |
| 0 | 49 | 49 | 49 |
| 5 | 27 | 26 | 24 |
| 10 | 20 | 18 | 7 |
| 15 | 15 | 5 | 0 |

PHR = parts per hundred parts polymer
SCR = ratio of shell polymer to core polymer It can be seen from this data that increasing the weight fraction of the lower Tg shell polymer while maintaining the same overall Tg/hardness (i.e., increasing the Tg of the core) results in significantly lower MFT's at a given level of solvent. Another viewpoint would be that this would allow the formulator to obtain a target MFT with much reduced levels of cosolvent.

Example 38

Ink Coatings Formulations

Into a vessel containing a latex prepared in Examples 13–15 and 20–22 were added under stirring Eastek 2140 or 1300 polyester dispersion, available from Eastman Chemical, 50/50 propanol/water, deionized water, BCD-9535 blue pigment dispersion available from Sun Chemical, BD-1010 black pigment dispersion available from Drew Graphics, SURFYNOL 104PG surfactant available from Air Products, and D65 defoamer available from Dow Corning. Samples 1–18 were thus prepared at various compositions as described in Table 5–7.

Viscosity

The viscosity of the ink formulated samples was measured with a #2 Zahn cup. The measured viscosities (in seconds) of the samples are recorded in Tables 5–7.

Test Procedures

The ink coating formulations of Samples 1–18 were drawn down side-by-side on an aluminum foil and Leneta using an RK coater with RK #1 and RK #2 rods. The draw downs were placed in an oven at 100° C. for 3 seconds followed by room temperature for 30 seconds prior to testing. The following tests were carried out:

Transparency

The samples were applied side-by-side on Leneta substrate with a RK #1 and RK #2 wired rods. Samples were evaluated over Leneta black, subjectively on a scale from 1 (poor) to 4 (excellent). The average of four measurements is reported in Tables 5–7.

Gloss

The samples of the formulated inks were drawn down over a Leneta substrate with an RK #1 rod or were printed on clay coated (CC) paper for the printed sample. The gloss of the samples was determined using a DR Lange Labor-Reflektometer RL3 gloss meter at 60 degrees. Higher values indicate greater gloss.

Heat/block Resistance

The heat/block resistance measures the temperature at which a formulated ink film fails in a Sentinel Heat Sealer after one second at 40 psi. The temperature at failure is reported in Tables 5–7.

Adhesion

The ink formulated samples were drawn on aluminum foil and conditioned in a 100° C. oven for three seconds. Adhesion was determined using 3M scotch tape # 610, ¾ inch wide. A strip of fresh tape was placed and smoothed on the sample to be tested using a firm finger pressure. The tape was then pulled back quickly at an angle of approximately 45 degrees above the horizontal. The results were rated as the degree of the ink removal from the printed samples. Four samples were tested and rated subjectively on a scale from 1 (poor) to 4 (excellent) in Table 5 and on a scale from 1 (poor) to 5 (excellent) in Tables 6 and 7. The average of the four ratings is reported in Tables 5–7.

Water Resistance

Samples were prepared and conditioned as described in the adhesion test above. The water resistance of the samples was determined by applying distilled water drops on the ink surface for 1, 5 and 20 minutes. The water was then wiped off with a facial tissue. The results were rated as percent of ink removal from the printed samples on a scale from 1 to 4 in Table 5 and 1 to 5 in Tables 6 and 7, as above. The average of four measurements is reported in Tables 5–7.

Alcohol Resistance

Samples were prepared and conditioned as described in the adhesion test above. The alcohol resistance of the samples was determined by applying ethanol or propanol drops on the ink surface for 1 minute. The alcohol was subsequently wiped off with a facial tissue. The results were rated as percent of ink removed from the printed samples on a scale from 1 to 4 in Table 5 and on a scale from 1 to 5 in Tables 6 and 7, as above. The average of four ratings is reported in Tables 5–7.

Printability

Formulated ink samples were employed on a rotogravure laboratory printing press equipment and printed over clay coated paper. The quality of the printed samples was subjectively evaluated. The samples were rated on a scale from 1 to 4 in Table 5 and from 1 to 5 in Tables 1 to 5 in Tables 6 and 7, as previously described. The average of at least four tests is presented in Tables 5–7.

Rewettability

Formulated ink samples were tested on a rotogravure printing press equipped with a stainless tone wedge cylinder with known cell volumes. The testing is done on clay coated paper. Prior to assessing rewet characteristics of the ink a printed control is obtained to be used for determination of a point during the rewet test at which the print quality has returned to the initial level. The press was then stopped, the doctor blade left engaged (in contact with the cylinder) and the ink was left to dry in the sump and n the cylinder for 10 minutes. After 10 minutes, the printing was resumed and a specimen taken to be evaluated for dry-in coverage area. In accordance with this test, a formulated ink sample having good rewettability shows a continuous color with no change in color density. In contrast, a formulated ink sample with poor rewettability shows a repeated pattern of dark and light areas. The dark areas represent the section of the cylinder that was immersed in the ink during the 10 minutes of idle press operation. The samples were rated on a scale from 1 to 4 as previously described and the average of four tests is presented in Tables 5–7.

TABLE 6-continued

| Sample | 7 | 8 | 9 | 10 | 11 | 12 |
|---|---|---|---|---|---|---|
| SURFONYL 104PG surfactant[4] | 0.7 | 0.7 | 0.7 | 0.7 | 0.7 | 0.7 |
| D65 Defoamer[5] | 0.1 | 0.1 | 0.1 | 0.1 | 0.1 | 0.1 |
| TOTAL | 100.0 | 100.0 | 100.0 | 100.0 | 100.0 | 100.0 |
| B. Properties | | | | | | |
| Viscosity (#2 Zahn cup) | 23 | 17 | 17 | 18 | 18 | 20 |
| Transparency (on Leneta) | 5 | 4 | 1 | 1 | 5 | 4 |
| Gloss @ 60° CC paper | 31 | 35 | 32 | 30 | 32 | 31 |
| Heat/Block Resistance | 190 | 160 | 190 | 190 | 170 | 160 |
| Adhesion on Aluminum Foil | 3 | 5 | 3 | 3 | 3 | 3 |
| Water Resistance on Al Foil | 4 | 1 | 5 | 4 | 2 | 2 |
| Alcohol Resistance on Al Foil | 1 | 1 | 1 | 1 | 1 | 1 |
| Printability | 4 | 5 | 5 | 2 | 3 | 3 |
| Rewettability | 5 | 5 | 5 | 3 | 5 | 5 |

Suppliers: [1]Eastman Chemical; [2]S. C. Johnson; [3]Sun Chemical; [4]Air Products; [5]Dow Corning.

TABLE 5

| Sample | 1 | 2 | 3 | 4 | 5 | 6 |
|---|---|---|---|---|---|---|
| A. Formulations | | | | | | |
| Latex of Example 20 | 59.2 | | | 59.2 | | |
| Latex of Example 21 | | 59.2 | | | 59.2 | |
| Latex of Example 22 | | | 69.2 | | | 69.2 |
| EASTEK 1300 Polyester[1] | 10.0 | 10.0 | | 10.0 | 10.0 | |
| 50/50 Propanol/deionized Water | 10.0 | 10.0 | 10.0 | 10.0 | 10.0 | 10.0 |
| BCD-9535 Blue Pigment[2] | 20.0 | 20.0 | 20.0 | | | |
| BD-1010 Black Pigment[3] Dispersion[3] | | | | 20.0 | 20.0 | 20.0 |
| SURFYNOL 104PG Surfactant[4] | 0.7 | 0.7 | 0.7 | 0.7 | 0.7 | 0.7 |
| D65 Defoamer[5] | 0.1 | 0.1 | 0.1 | 0.1 | 0.1 | 0.1 |
| TOTAL | 100.0 | 100.0 | 100.0 | 100.0 | 100.0 | 100.0 |
| B. Properties | | | | | | |
| Viscosity (#2 Zahn cup, sec) | 17 | 17 | 21 | 19 | 17 | 18 |
| Transparency (on Leneta) | 2.0 | 2.5 | 3.0 | 3.5 | 3.0 | 3.5 |
| Gloss (@ 60°, on Leneta) | 27 | 28 | 40 | 27 | 25 | 47 |
| Heat/Block Resistance (@ 40 psi, 1 sec. on clay coated paper, °F.) | 200 | 180 | 160 | 210 | 200 | 170 |
| Adhesion (average of 4) on aluminum foil | 2.7 | 3.0 | 3.3 | 3.0 | 3.3 | 3.8 |
| Water Resistance (average of 4) on aluminum foil | 4.0 | 4.0 | 2.3 | 4.0 | 4.0 | 3.5 |
| Alcohol Resistance (average of 4) on aluminum foil | 2.3 | 2.3 | 2.0 | 2.0 | 2.0 | 1.0 |
| Printability on gravure press over clay coated paper | 3.0 | 3.0 | 3.3 | 2.0 | 3.5 | 3.3 |
| Rewettability on gravure press over clay coated paper | 3.5 | 3.5 | 4.0 | 4.0 | 4.0 | 4.0 |

Suppliers: [1]Eastman Chemical; [2]Sun Chemical; [3]Drew Graphics; [4]Air Products; [5]Dow Corning.

TABLE 6

| Sample | 7 | 8 | 9 | 10 | 11 | 12 |
|---|---|---|---|---|---|---|
| A. Formulations | | | | | | |
| Latex of Example 13 | | | 51.9 | 51.9 | | 17.3 |
| Latex of Example 14 | | | | | 51.9 | |
| Latex of Example 15 | | | | 17.3 | 17.3 | 51.9 |
| EASTEK 2140 Polyester[1] | | 51.9 | | | | |
| EASTEK 1300 Polyester[1] | | 17.3 | 17.3 | | | |
| JONCRYL 87 acrylic latex[2] | 44.4 | | | | | |
| JONCRYL 77 acrylic latex[2] | 14.8 | | | | | |
| 50/50 Propanol/Water | 10.0 | 10.0 | 10.0 | 10.0 | 10.0 | 10.0 |
| Deionized Water | 10.0 | | | | | |
| BCD-9535 Pigment Blue[3] | 20.0 | 20.0 | 20.0 | 20.0 | 20.0 | 20.0 |

TABLE 7

| Sample | 13 | 14 | 15 | 16 | 17 | 18 |
|---|---|---|---|---|---|---|
| A. Formulations | | | | | | |
| Latex from Example 13 | | | 51.9 | 51.9 | | 17.3 |
| Latex from Example 14 | | | | | 51.9 | |
| Latex from Example 15 | | | | 17.3 | 17.3 | 51.9 |
| EASTEK 2140 Polyester[1] | | 51.9 | | | | |
| EASTEK 1300 Polyester[1] | | 17.3 | 17.3 | | | |
| Joncryl 87 acrylic latex[2] | 44.4 | | | | | |
| Joncryl 77 acrylic latex[2] | 14.8 | | | | | |
| 50/50 Isopropanol/Water | 10.0 | 10.0 | 10.0 | 10.0 | 10.0 | 10.0 |
| Deionized Water | 10.0 | | | | | |
| BD-1010 Black Dispersion[3] | 20.0 | 20.0 | 20.0 | 20.0 | 20.0 | 20.0 |
| Surfynol 104PG surfactant[4] | 0.7 | 0.7 | 0.7 | 0.7 | 0.7 | 0.7 |

TABLE 7-continued

| Sample | 13 | 14 | 15 | 16 | 17 | 18 |
|---|---|---|---|---|---|---|
| D65 Defoamer[5] | 0.1 | 0.1 | 0.1 | 0.1 | 0.1 | 0.1 |
| TOTAL | 100.0 | 100.0 | 100.0 | 100.0 | 100.0 | 100.0 |
| B. Properties | | | | | | |
| Viscosity #2 Zahn | 23 | 17 | 17 | 20 | 20 | 23 |
| Transparency (on Leneta) | 4 | 3 | 2 | 2 | 4 | 4 |
| Gloss @ 60° on clay coated paper | 43 | 39 | 42 | 30 | 34 | 36 |
| Heat/Block Resistance | 210 | 180 | 210 | 210 | 180 | 170 |
| Adhesion on Aluminum Foil | 4 | 4 | 3 | 3 | 4 | 4 |
| Water Resistance on Al Foil | 5 | 2 | 5 | 5 | 2 | 2 |
| Alcohol Resistance on Al Foil | 1 | 1 | 1 | 1 | 1 | 1 |
| Printability | 4 | 5 | 5 | 3 | 3 | 3 |
| Rewettability | 4 | 4 | 5 | 3 | 5 | 5 |

Suppliers: [1]Eastman Chemical; [2]S. C. Johnson; [3]Drew Graphics; [4]Air Products; [5]Dow Corning.

Example 39

COATING FORMULATIONS

All amounts in the formualtions below are in grams.

TOPCOAT FORMULATIONS

Procedure: Premix Eastman EB (ethylene glycol monobutyl ether, available from Eastman Chemical Company) and dipropylene glycol monobutyl ether. Weigh the latex (or latexes) into an appropriate sized container, place container under a three bladed stirrer, and apply enough agitation to keep a good vortex. Slowly pour into the cosolvent premix and continue stirring for a least 15 minutes. The formulations are shown in Table 8.

TABLE 8

| | Topcoat | Topcoat Blend |
|---|---|---|
| Latex from Sample 23 | 81.9 | 69.0 |
| Latex from Sample 24 | 0 | 12.2 |
| Eastman EB - (Cosolvent) Ethylene Glycol Monobutyl Ether | 17.2 | 17.2 |
| Dipropylene Glycol Monobutyl Ether - (cosolvent) | 0.9 | 0.9 |

SEALER FORMULATIONS

Procedure: Premix the Eastman EB and the dipropylene glycol monobutyl ether. Weigh the latex into an appropriate sized container, place container under a three bladed stirrer, and add enough agitation to keep a good vortex. Slowly pour in the cosolvent premix and continue stirring for at least 15 minutes. The formulations are shown in Table 9.

TABLE 9

| | Topcoat |
|---|---|
| Latex from Sample 24 | 92.4 |
| Eastman EB - (cosolvent) Ethylene Glycol Monobutyl Ether | 7.2 |
| Dipropylene Glycol Monobutyl Ether 0 (cosolvent) | 0.4 |

NITROCELLULOSE FORMULATIONS

Procedure: Weigh the ingredients in the order listed into an appropriate container, seal the container, and let roll overnight on a roller. The formulations are shown in Table 10.

TABLE 10

| | Topcoat | Sealer |
|---|---|---|
| RS ¼ sec. NC (nitrocellulose) | 11.4 | 10.9 |
| Beckosol 12-035 (alkyd resin) | | 7.6 |
| Beckosol 90-095 (alkyd resin) | 15 | |
| DOP (plasticizer) | 3 | 3.8 |
| Ethyl Acetate (cosolvent) | 1.6 | |
| Butyl Acetate (cosolvent) | 1.6 | 24.5 |
| Isopropyl Alcohol (cosolvent) | 8.6 | |
| Butyl Alcohol (cosolvent) | | 7.6 |
| MEK (methyl ethyl ketone; cosolvent) | | 7.6 |
| MAK (methyl amyl ketone; cosolvent) | 8 | 3.8 |
| Toluene (cosolvent) | 15 | |
| Xylene (cosolvent) | 7 | 26.6 |
| Unirez 7003 (maleic resin hardener) | | 3.1 |

COMPARATIVE FORMULATIONS

Procedure: Premix the appropriate cosolvents in the order listed. Weigh the latex (or latexes) into an appropriate sized container, place container under a three bladed stirrer, and add enough agitation to keep a good vortex. Add the water where needed, and slowly add the 14% ammonia where needed. Slowly pour in the appropriate cosolvent premix and continue stirring for at least 15 minutes. The comparative results are shown in Table 11 below.

TABLE 11

| | CL-104 | CL-105 | CL-104/CL-106 | Joncryl-95 |
|---|---|---|---|---|
| Control Emulsions | 80.43 | 76.90 | 65.6/21.9 | 97.66 |
| Water | 10.37 | 12.60 | 3.98 | |
| 14% Ammonia | 0.43 | | | |
| Aromatic 150 (cosolvent) | | | | 1.89 |
| Eastman DB (cosolvent) | 3.33 | | | |
| Eastman DM (cosolvent) | | | | 0.45 |
| Eastman EB (cosolvent) | | 4.20 | 3.36 | |
| Eastman EEH (cosolvent) | | 0.70 | | |
| Ethylene Glycol Hexyl Ether (cosolvent) | 5.45 | | 5.12 | |
| Isopropyl Alcohol (cosolvent) | | 5.60 | | |

In all cases pH was adjusted as suggested in current literature from the manufacturer. Latexes of the invention were adjusted to pH = 8.5 before coalescent was added.
CL-104, Cl-105, and CL-106 are emulsion plymers from Rohm & Haas. Joncryl-95 is an emulsion polymer from S. C. Johnson.

EVALUATION

Panel Preparation

General Panel Preparation: washcoat (nitrocellulose topcoat reduced to 7% solids), sand, stain (Behlen Walnut stain), sealer (1 mil wet), sand, topcoat (3 mil wet); washcoat, sealer and topcoat were all spray applied. Panels were stored at constant temperature and humidity (72° C., 50% humidity) except where otherwise indicated:

Test Procedure

The following tests were performed using the above formulations:

a. Adhesion (ASTM 4541-83) Elcometer (For sealers measured both on sealer alone and on sealer with a nitrocellulose topcoat).

b. Alcohol Resistance: (ASTM D 2S71) 6 hours spot test.

c. Appearance: Subjective visual, looking for flow, leveling, picture framing,warmth and definition of grain in wood.

d. Clarity: Subjective visual, looking for haze and/or whiteness/milkyness of clear film.

e. Tukon Hardness: Measured as 1.5 mil films over glass (ASTM 1474-92) 18 hr 70° C.

f. Mar: (ASTM 5178-Nickel test) (Measured on sealer with a nitrocellulose topcoat).

g. Print Resistance: (ASTM D 22091) 3 layers of topcoat oven dried 25 min. 50° C. then 2 lb. And 4 lb. Weights for 18 h.

h. Sandability: Tested for time until sandable, using new sheet of #220 sand paper and light hand pressure. Subjective (i.e. no balling and rolling or heavy packing). Should powder upon sanding.

i. Water Resistance: Visual, use black glass substrate and place on Cleveland condensing cabinet for 1 hr. Observe for any film defects (whitening, wrinkling, blistering).

The results of the adhesion evaluation of the samples as topcoat and wood sealer are shown in Tables 12 and 13, respectively, in comparison with commercial samples. The waterborne coating formulation exhibits superior water resistance, good appearance, clarity, hardness and low foaming.

minutes, cooled for 10 minutes, and tested for print resistance using a 6# weight over a square inch of coating. The dry film thickness of these coatings were about 1 mil. Print resistance ratings were made from 10–1 with 10=no effect and 1=severe printing. Microfoaming ratings were ranked with 1=least amount of microfoam to 5=most amount of microfoam.

TABLE 14

|  | 60/40 Ex. 28/Ex. 29 | 60/40 Ex. 29/Ex. 28 | CL-106 | CL-104 | WL-81 |
| --- | --- | --- | --- | --- | --- |
| Print Resistance | 4 | 10 | 2 | 10 | 2 |
| Microfoam | 3 | 1 | 2 | 4 | 5 |

Example 41

Gloss White Paint Metal Coatings

A gloss white paint was prepared, as listed below, with the polyester/acrylic hybrid latex polymer. The paint was then applied to a metal substrate (cold rolled steel with an iron phosphate treatment), and allowed to dry at 22° C. and 20% relative humidity; 22° C. and 50% relative humidity; 22° C.

TABLE 12

Wood Topcoat Properties

|  | Topcoat Formulation | Topcoat Blend Formulation | CL-104 Topcoat | CL-104/CL-106 Blend Topcoat | Solventborne Nitrocellulose |
| --- | --- | --- | --- | --- | --- |
| Adhesion | Excellent | Excellent | Good | Good | Excellent |
| Alcohol Resistance | Poor | Fair | Fair | Good | Excellent |
| Appearance | Good | Good | Good | Good | Excellent |
| Clarity | Good | Good | Good | Good | Excellent |
| Hardness (Tukon) | Excellent | Excellent | Good | Good | Excellent |
| Mar (Birch) | Fair | Poor | Poor | Poor | Good |
| Paint Resistance | Fair | Fair | Fair | Fair | Good |
| Sandability | Good | Good | Fair | Fair | Excellent |
| Water Resistance | Excellent | Excellent | Good | Good | Excellent |

TABLE 13

Wood Sealer Properties

|  | Example 17 Sealer | Joncryl-95 Sealer | CL-105 Sealer | Solventborne Nitrocellulose |
| --- | --- | --- | --- | --- |
| Adhesion (to NC and Wood) | Excellent | Poor | Fair | Excellent |
| Appearance | Good | Good | Good | Good |
| Clarity | Excellent | Excellent | Good | Excellent |
| Hardness (Tukon) | Good | Good | Good | Excellent |
| Sandability (Birch) | Good | Fair | Good | Excellent |
| Water Resistance | Excellent | Fair | Fair | Excellent |

Example 40

BLENDS

Blending a hard polymer like Example 29 with a soft polymer like Example 28 at ratios ranging from 60:40 to 80:20, gives excellent print resistance is excellent and good microfoaming is good when spraying the coating onto wood. Table 14 shows some comparative data to some commercial polymers (CL-106 latex, CL-104 latex, and WL-81 latex available from Rohm & Haas) were formulated as recommended in their respective product literature. The following were spray applied with an air spray gun to maple substrates, flashed (air dried) 5 minutes, dried in a 50° C. over for 20 and 99% relative humidity. Paints were also prepared from commercial polymers and applied in the same manner. These were observed for flash rusting and gloss. The results are shown in Table 15 below.

Procedure

Grind

Weighed out the titanium dioxide (TiPure R-706, available from DuPont) and put aside. Into Stainless steel beaker, weighed out Eastman DM solvent (available from Eastman Chemical Company), BYK 155 dispersant (available from BYK Chemie), Triton X-405 surfactant (available from Union Carbide), Drew L-493 defoamer (available from Ashland Chemical Company), and water. Measured ammonium hydroxide (28% aqoeous solution) into syringe.

Placed beaker on Premier mixer, added ammonia, and slowly added the titanium, increasing the mixing speed as needed. Grind for 20 minutes after all was in.

Letdown

Weighed latex into appropriate can. Weighed out the pigment grind into the can. Placed can on stirrer (3 blade), and added the Texanol coalescent (available from Eastman Chemical Company) (using syringe), RM-825 thickener (available from Rohm & Haas) (using syringe), and CT-111 surfactant (available from Air Products). Let stir for at least 15 minutes.

| Ingredients | Grams |
|---|---|
| Eastman DM | 78.3 |
| BYK 155 | 13.125 |
| NH$_4$OH (28%) | 2.05 |
| Drew L-493 | 1.7 |
| Water | 26.025 |
| Triton X-405 | 4.375 |
| TiPure R-706 | 437.5 |
| Water | 25.75 |
|  | 588.825 |
| Letdown | 58.48 |
| Latex from Example 31 | 180.37 |
| Texanol | 9.69 |
| Surfynol CT-111 | 0.22 |
| RM-825 | 1.08 |
|  | 294.84 |

TABLE 15

| | 60 degree Gloss | | |
|---|---|---|---|
| Formulation | 20% RH | 50% RH | 90% RH |
| Example 30 | 84 | 85 | 75 |
| Maincote HG54D (Rohm & Haas) | 65 | 67 | 68 |
| Rhoplex WL-81 (Rohm & Haas) | 66 | 66 | Film Cracked |
| Joncryl 537 (S. C. Johnson) | 84 | 84 | Film Cracked |
| | | | Flash Rust |
| Example 30 | no | no | no |
| Maincote HG54D (Rohm & Haas) | yes | yes | yes |
| Rhoplex WL-81 (Rohm & Haas) | no* | no* | no* |
| Joncryl 537 (S. C. Johnson) | no* | no* | yes |

*Rhoplex WL-81 and Joncryl 537 were formulated with a flash rust inhibitor.

These paints could be applied to cold rolled steel (no treatment); cold rolled steel (with a zinc phosphate treatment); hot rolled steel; aluminum; and galvanized. The paint based on Example 30, a polyester/acrylic hybrid latex polymer of the invention exhibited no flash rusting over the range of relative humidities without a flash rust inhibitor.

The claimed invention is:

1. A polyester/acrylic hybrid latex prepared by free radical emulsion polymerization, the latex prepared in two stages,
    wherein in a hydrophilic first stage, a free radical emulsion polymer particle is prepared from about 10–40 weight percent of hydrophilic monomers and about 90–60 weight percent of hydrophobic monoethylenically unsaturated monomers, based on the total weight of monomers used, wherein the hydrophobic monoethylenically unsaturated monomers are comprised of at least about 10 weight percent of styrene, in the presence of a water-dispersible sulfonated polyester or polyester-amide; and
    wherein in a hydrophobic second stage, at least one hydrophobic monomer is free radically emulsion polymerized in the presence of the free radical emulsion polymer particle from the hydrophilic first stage and the water-dispersible sulfonated polyester or polyester amide from the first stage, wherein the hydrophilic first stage migrates to the particle surface and becomes the shell of the resulting polymer particle and wherein the weight of monomers to prepare the first stage comprises about 5 to 70 wt % of the total monomers used.

2. The polyester/acrylic hybrid latex of claim 1, wherein the first stage is prepared from 10–25 weight percent of hydrophilic monomers.

3. The polyester/acrylic hybrid latex of claim 1, wherein the first stage is prepared from 10–20 weight percent of hydrophilic monomers.

4. The polyester/acrylic hybrid latex of claim 1, wherein the weight of monomers used to prepare the first stage portion comprises about 15–55 weight percent of the total monomers used to prepare the latex.

5. The polyester/acrylic hybrid latex of claim 1, wherein the water-dispersible sulfonated polyester or polyester-amide is present in the latex in a concentration of about 1–40 weight percent, based on the total weight of solids.

6. The polyester/acrylic hybrid latex of claim 1, wherein the water-dispersible sulfonated polyester or polyester-amide is present in the latex in a concentration of about 2–20 weight percent, based on the total weight of solids.

7. The polyester/acrylic hybrid latex of claim 1, wherein the water-dispersible sulfonated polyester or polyester-amide is present in the latex in a concentration of about 2–6 weight percent, based on the total weight of solids.

8. The polyester/acrylic hybrid latex of claim 1, wherein the water-dispersible sulfonated polyester or polyester-amide is comprised of:
    (i) monomer residues of at least one dicarboxylic acid;
    (ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
    (iii) monomer residues of at least one diol or a mixture of a diol and a diamine; and optionally:
        (iv) monomer residues of at least one difunctional monomer reactant selected from hydroxycarboxylic acids, aminocarboxylic acids and aminoalkanols;
    provided that at least 20 percent of the groups linking the monomeric units are ester linkages.

9. The polyester/acrylic hybrid latex of claim 1, wherein the hydrophilic monomers are selected from the group consisting of hydroxyethyl methacrylate, hydroxyethyl acrylate, and methacrylic acid.

10. The polyester/acrylic hybrid latex of claim 1, wherein the hydrophobic monomers are selected from the group consisting of styrene, methyl methacrylate, butyl acrylate, ethylhexyl acrylate, butyl methacrylate, ethylhexyl methacrylate, ethyl acrylate, acetoacetoxy ethyl methacrylate, acetoacetoxy butyl methacrylate, acetoacetoxy ethyl acrylate and acrylonitrile.

11. The polyester/acrylic hybrid latex of claim 1, wherein the size of the particles in the latex is about 40 to 100 nm in diameter.

12. The polyester/acrylic hybrid latex of claim 1, wherein the size of the particles in the latex is about 40 to 80 nm in diameter.

13. An article coated with a polyester/acrylic hybrid latex prepared by free radical emulsion polymerization, the latex prepared in two stages,
    wherein in a hydrophilic first stage, a free radical emulsion polymer particle is prepared from about 10–40 weight percent of hydrophilic monomers and about 90–60 weight percent of hydrophobic monoethylenically unsaturated monomers, based on the total weight of monomers used, wherein the hydrophobic monoethylenically unsaturated monomers are comprised of at least about 10 weight percent of styrene, in the presence of a water-dispersible sulfonated polyester or polyester-amide; and wherein in a hydrophobic second stage, at least one hydrophobic monomer is free radically emulsion polymerized in the presence of the free radical emulsion polymer particle from the hydrophilic first stage and the water-dispersible sulfonated polyester or polyester amide from the first stage, wherein the hydrophilic first stage migrates to the particle surface and becomes the shell of the resulting polymer particle and wherein the weight of monomers to prepare the first stage comprises about 5 to 70 wt % of the total monomers used.

14. A waterborne coating composition comprising a blend of
a) water;
b) at least one polyester/acrylic hybrid latex prepared by free radical emulsion polymerization, the latex prepared in two stages,
wherein in a hydrophilic first stage, a free radical emulsion polymer particle is prepared from about 10–40 weight percent of hydrophilic monomers and about 90–60 weight percent of hydrophobic monoethylenically unsaturated monomers, based on the total weight of monomers used, wherein the hydrophobic monoethylenically unsaturated monomers are comprised of at least about 10 weight percent of styrene, in the presence of a water-dispersible sulfonated polyester or polyester-amide; and
wherein in a hydrophobic second stage, at least one hydrophobic monomer is free radically emulsion polymerized in the presence of the free radical emulsion polymer particle from the hydrophilic first stage and the water-dispersible sulfonated polyester or polyester amide from the first stage, wherein the hydrophilic first stage migrates to the particle surface and becomes the shell of the resulting polymer particle and wherein the weight of monomers to prepare the first stage comprises about 5 to 70 wt % of the total monomers used; and
c) one or more water-dispersible polymers selected from the group consisting of polyesters, polyester-amides, cellulose esters, alkyds, polyurethanes, epoxy resins, polyamides, acrylics, and vinyl polymers.

15. A waterborne ink coating formulation comprising a blend of:
a) at least one polyester/acrylic hybrid latex prepared by free radical emulsion polymerization, the latex prepared in two stages,
wherein in a hydrophilic first stage, a free radical emulsion polymer particle is prepared from about 10–40 weight percent of hydrophilic monomers and about 90–60 weight percent of hydrophobic monoethylenically unsaturated monomers, based on the total weight of monomers used, wherein the hydrophobic monoethylenically unsaturated monomers are comprised of at least about 10 weight percent of styrene, in the presence of a water-dispersible sulfonated polyester or polyester-amide; and
wherein in a hydrophobic second stage, at least one hydrophobic monomer is free radically emulsion polymerized in the presence of the free radical emulsion polymer particle from the hydrophilic first stage and the water-dispersible sulfonated polyester or polyester amide from the first stage, wherein the hydrophilic first stage migrates to the particle surface and becomes the shell of the resulting polymer particle and wherein the weight of monomers to prepare the first stage comprise about 5 to 70 wt % of the total monomers used;

b) at least one water-dispersible polymer selected from the group consisting of polyester, polyester-amide, cellulose ester, alkyd, polyurethane, epoxy resin, polyamide, acrylic, and vinyl polymer;
c) at least one additive selected from the group consisting of surfactant, pigment, and defoamer; and
d) a solvent or coalescing agent.

16. The waterborne ink coating formulation of claim 15, wherein the solvent or coalescing agent is a $C_1$–$C_6$ branched or straight chain water-soluble alcohol.

17. The waterborne ink coating formulation of claim 15, wherein the water-dispersible sulfonated polyester or polyester amide is present in an amount of from 1 to 40 wt %, based on the total solids of the polyester/acrylic hybrid latex.

18. The waterborne ink coating formulation of claim 15, wherein the polyester/acrylic hybrid latex polymer is present in an amount of from 30 to 90 wt %, based on the total amount of the formulation.

19. A waterborne coating formulation comprising a blend of:
a) at least one polyester/acrylic hybrid latex prepared by free radical emulsion polymerization, the latex prepared in two stages,
wherein in a hydrophilic first stage, a free radical emulsion polymer particle is prepared from about 10–40 weight percent of hydrophilic monomers and about 90–60 weight percent of hydrophobic monoethylenically unsaturated monomers, based on the total weight of monomers used, wherein the hydrophobic monoethylenically unsaturated monomers are comprised of at least about 10 weight percent of styrene, in the presence of a water-dispersible sulfonated polyester or polyester-amide; and
wherein in a hydrophobic second stage, at least one hydrophobic monomer is free radically emulsion polymerized in the presence of the free radical emulsion polymer particle from the hydrophilic first stage and the water-dispersible sulfonated polyester or polyester amide from the first stage, wherein the hydrophilic first stage migrates to the particle surface and becomes the shell of the resulting polymer particle and wherein the weight of monomers to prepare the first stage comprise about 5 to 70 wt % of the total monomers used;
b) optionally an additive selected from the group consisting of surfactant, pigment, and defoamer; and
c) at least one solvent or coalescing agent.

20. The waterborne coating formulation of claim 19, wherein the solvent or coalescing agent is selected from the group consisting of ethylene glycol monobutyl ether and dipropylene glycol monobutyl ether.

21. The waterborne coating formulation of claim 19, wherein the polyester/acrylic hybrid latex polymer is present in an amount of from 30 to 90 wt %, based on the total amount of the formulation.

22. The waterborne coating formulation of claim 19, wherein the coating formulation is a waterborne wood coating formulation.

23. The waterborne wood coating formulation of claim 19, wherein the formulation is a topcoat or a sealer coat.

24. The waterborne coating formulation of claim 19, wherein the coating formulation is a metal coating formulation.

* * * * *